US008118920B2

(12) United States Patent
Vrzalik et al.

(10) Patent No.: US 8,118,920 B2
(45) **Date of Patent: *Feb. 21, 2012**

(54) MULTI-LAYERED SUPPORT SYSTEM

(75) Inventors: John H. Vrzalik, San Antonio, TX (US); Alan L. Bartlett, New Braunfels, TX (US); Royce Johnson, Universal City, TX (US)

(73) Assignee: KCI Licensing, Inc., San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/048,642

(22) Filed: Mar. 15, 2011

(65) Prior Publication Data

US 2011/0219548 A1 Sep. 15, 2011

Related U.S. Application Data

(63) Continuation of application No. 11/746,953, filed on May 10, 2007, now Pat. No. 7,914,611.

(60) Provisional application No. 60/799,526, filed on May 11, 2006, provisional application No. 60/874,210, filed on Dec. 11, 2006.

(51) Int. Cl.
*B01D 53/22* (2006.01)
*A47C 21/04* (2006.01)

(52) U.S. Cl. ............... 96/11; 96/4; 96/6; 96/226; 95/45; 95/52; 55/385.1; 55/467; 5/714; 5/724; 5/726; 5/652.1

(58) Field of Classification Search ................ 95/45, 52, 95/266; 96/4, 6, 11, 223, 226; 55/385.1, 55/467, 473; 5/714, 724, 725, 726, 652.1, 5/652.2, 941; 210/640
See application file for complete search history.

(56) References Cited

U.S. PATENT DOCUMENTS

| | | | | |
|---|---|---|---|---|
| 2,826,244 | A | 3/1958 | Hurley | 5/652.2 |
| 3,735,559 | A | 5/1973 | Salemme | 95/52 |
| 4,185,341 | A | 1/1980 | Scales | 5/699 |
| 4,483,030 | A | 11/1984 | Flick et al. | 5/691 |
| 4,825,488 | A | 5/1989 | Bedford | 5/726 |
| 4,853,992 | A | 8/1989 | Yu | 5/423 |
| 4,997,230 | A | 3/1991 | Spitalnick | 297/180.11 |
| 5,007,123 | A | 4/1991 | Salyards | 5/699 |
| 5,035,014 | A | 7/1991 | Blanchard | 5/424 |
| 5,249,319 | A | 10/1993 | Higgs | 5/714 |
| 5,416,935 | A | 5/1995 | Nieh | 5/423 |

(Continued)

FOREIGN PATENT DOCUMENTS

| | | | |
|---|---|---|---|
| EP | 0870449 | | 10/1998 |
| EP | 1 151 698 | A2 * | 11/2001 |
| EP | 1151698 | A2 | 11/2001 |
| EP | 1 645 258 | A1 * | 4/2006 |
| EP | 1645258 | A1 | 4/2006 |

(Continued)

OTHER PUBLICATIONS

Office Communication, issued in Australian Patent Application No. 2007249236, mailed Mar. 17, 2011.

(Continued)

*Primary Examiner* — Jason M Greene
(74) *Attorney, Agent, or Firm* — Fulbright & Jaworski L.L.P.

(57) ABSTRACT

In various embodiments, a support system includes a multi-layer cover sheet with a number of layers. In certain embodiments, a source to move air inside and outside the multi-layer cover sheet can be provided. The source can include a source of positive pressure or negative pressure.

22 Claims, 13 Drawing Sheets

U.S. PATENT DOCUMENTS

| | | | | |
|---|---|---|---|---|
| 5,473,783 | A | 12/1995 | Allen | 5/652.2 |
| 5,498,278 | A | 3/1996 | Edlund | 96/11 |
| 5,611,096 | A | 3/1997 | Bartlett et al. | 5/617 |
| 5,640,728 | A | 6/1997 | Graebe | 5/606 |
| 5,647,079 | A | 7/1997 | Hakamiun et al. | 5/713 |
| 5,681,368 | A | 10/1997 | Rahimzadeh | 95/52 |
| 5,701,621 | A | 12/1997 | Landi et al. | 5/691 |
| 5,755,000 | A | 5/1998 | Thompson | 5/713 |
| 5,882,349 | A * | 3/1999 | Wilkerson et al. | 5/423 |
| 5,887,304 | A | 3/1999 | Von der Heyde | 5/726 |
| 5,926,884 | A | 7/1999 | Biggie et al. | 5/714 |
| 6,065,166 | A | 5/2000 | Sharrock et al. | 5/630 |
| 6,085,369 | A | 7/2000 | Feher | 5/423 |
| 6,182,315 | B1 | 2/2001 | Lee | 5/690 |
| 6,272,707 | B1 | 8/2001 | Robrecht et al. | 5/724 |
| 6,288,076 | B1 | 9/2001 | Kostyniak et al. | 514/299 |
| 6,336,237 | B1 | 1/2002 | Schmid | 5/726 |
| 6,341,395 | B1 | 1/2002 | Chao | 5/423 |
| 6,353,950 | B1 | 3/2002 | Bartlett et al. | 5/617 |
| 6,418,579 | B2 | 7/2002 | Perez et al. | 5/713 |
| 6,421,859 | B1 | 7/2002 | Hicks et al. | 5/722 |
| 6,487,739 | B1 | 12/2002 | Harker | 5/729 |
| 6,493,889 | B2 | 12/2002 | Kocurek | 5/423 |
| 6,527,832 | B2 | 3/2003 | Oku et al. | 96/4 |
| 6,546,576 | B1 | 4/2003 | Lin | 5/423 |
| 6,671,911 | B1 | 1/2004 | Hill et al. | 5/713 |
| 6,687,937 | B2 | 2/2004 | Harker | 5/726 |
| 6,709,492 | B1 | 3/2004 | Spadaccini et al. | 96/6 |
| 6,779,592 | B1 | 8/2004 | Ichigaya | 165/46 |
| 6,782,574 | B2 | 8/2004 | Totton et al. | 5/726 |
| 6,868,569 | B2 | 3/2005 | VanSteenburg | 5/709 |
| 6,904,629 | B2 | 6/2005 | Wu | 165/46 |
| 7,036,163 | B2 | 5/2006 | Schmid | 5/423 |
| 7,140,495 | B2 | 11/2006 | Hester et al. | 210/490 |
| 7,165,281 | B2 | 1/2007 | Larssson et al. | 5/724 |
| 7,191,482 | B2 | 3/2007 | Romano et al. | 5/714 |
| 7,240,386 | B1 | 7/2007 | McKay et al. | 5/724 |
| 7,290,300 | B1 | 11/2007 | Khambete | 5/423 |
| 7,296,315 | B2 | 11/2007 | Totton et al. | 5/737 |
| 7,334,280 | B1 | 2/2008 | Swartzburg | 5/724 |
| 7,357,830 | B2 | 4/2008 | Weidmann | 95/52 |
| 7,480,953 | B2 | 1/2009 | Romano et al. | 5/714 |
| 7,631,377 | B1 | 12/2009 | Sanford | 5/423 |
| 7,637,573 | B2 | 12/2009 | Bajic et al. | 297/452.43 |
| 7,712,164 | B2 | 5/2010 | Chambers | 5/423 |
| 7,886,385 | B2 | 2/2011 | Carlitz | 5/691 |
| 7,913,332 | B1 | 3/2011 | Barnhart | 5/423 |
| 7,914,611 | B2 * | 3/2011 | Vrzalik et al. | 96/11 |
| 7,937,789 | B2 | 5/2011 | Feher | 5/421 |
| 7,937,791 | B2 | 5/2011 | Meyer et al. | 5/727 |
| 7,966,680 | B2 | 6/2011 | Romano et al. | 5/713 |
| 2001/0023512 | A1 | 9/2001 | Perez et al. | 5/713 |
| 2002/0129449 | A1 | 9/2002 | Harker | 5/726 |
| 2002/0148047 | A1 | 10/2002 | Corzani et al. | 5/738 |
| 2003/0019044 | A1 | 1/2003 | Larsson et al. | 5/724 |
| 2003/0145380 | A1 | 8/2003 | Schmid | 5/423 |
| 2004/0003471 | A1 | 1/2004 | VanSteenburg | 5/709 |
| 2004/0064888 | A1 | 4/2004 | Wu | 5/423 |
| 2004/0214495 | A1 | 10/2004 | Foss et al. | 442/199 |
| 2004/0237203 | A1 | 12/2004 | Romano et al. | 5/713 |
| 2005/0011009 | A1 | 1/2005 | Wu | 5/729 |
| 2005/0022308 | A1 | 2/2005 | Totton et al. | 5/713 |
| 2005/0086739 | A1 | 4/2005 | Wu | 5/423 |
| 2005/0188467 | A1 | 9/2005 | Woolfson | 5/726 |
| 2005/0278863 | A1 | 12/2005 | Bahash et al. | 5/726 |
| 2006/0010607 | A1 | 1/2006 | Schneider | 5/713 |
| 2006/0080778 | A1 | 4/2006 | Chambers | 5/652.2 |
| 2007/0056116 | A1 | 3/2007 | Galardo | 5/724 |
| 2007/0234481 | A1 | 10/2007 | Totton et al. | 5/714 |
| 2007/0266499 | A1 | 11/2007 | O'Keefe et al. | 5/713 |
| 2008/0028536 | A1 | 2/2008 | Hadden-Cook | 5/724 |
| 2008/0060131 | A1 | 3/2008 | Tompkins | 5/423 |
| 2008/0098529 | A1 | 5/2008 | Flocard et al. | 5/652.2 |
| 2008/0263776 | A1 | 10/2008 | O'Reagan et al. | 5/714 |
| 2009/0322124 | A1 | 12/2009 | Barkow et al. | 297/180.14 |
| 2010/0043143 | A1 | 2/2010 | O'Reagan et al. | 5/421 |
| 2010/0095461 | A1 | 4/2010 | Romano et al. | 5/710 |
| 2010/0175196 | A1 | 7/2010 | Lafleche et al. | 5/707 |
| 2010/0287701 | A1 | 11/2010 | Frias | 5/423 |
| 2011/0004997 | A1 | 1/2011 | Hale et al. | 5/699 |
| 2011/0010850 | A1 | 1/2011 | Frias | 5/423 |
| 2011/0010855 | A1 | 1/2011 | Flessate | 5/484 |
| 2011/0035880 | A1 | 2/2011 | Cole et al. | 5/423 |
| 2011/0107514 | A1 | 5/2011 | Brykalski et al. | 5/421 |

FOREIGN PATENT DOCUMENTS

| | | |
|---|---|---|
| EP | 1687139 | 8/2006 |
| EP | 1863369 | 12/2007 |
| EP | 1901636 | 3/2008 |
| EP | 1919328 | 5/2008 |
| EP | 1971246 | 9/2008 |
| EP | 2047770 | 4/2009 |
| EP | 2258242 | 12/2010 |
| EP | 2319474 | 5/2011 |
| JP | H02-11144 | 1/1990 |
| JP | 11-164757 | 6/1999 |
| JP | 11-169262 | 6/1999 |
| JP | 11-332697 | 12/1999 |
| JP | 2000-152854 | 6/2000 |
| JP | 2002-125809 | 5/2002 |
| JP | 2003-230605 | 8/2003 |
| WO | WO 2004/082551 | 9/2004 |
| WO | WO 2004/082551 A1 * | 9/2004 |
| WO | WO 2005/046988 | 5/2005 |
| WO | WO 2006/122614 | 4/2006 |
| WO | WO 2007/003018 | 6/2006 |
| WO | WO 2006/105169 | 10/2006 |
| WO | WO 2007/034311 | 3/2007 |
| WO | WO 2011/067720 | 6/2011 |

OTHER PUBLICATIONS

Office Communication, issued in Chinese Patent Application No. 200780016996.3, mailed May 27, 2010. (English translation provided).

Office Communication, issued in European Patent Application No. EP07783677, mailed Feb. 15, 2011.

Office Communication, issued in U.S. Appl. No. 11/746,953, mailed Aug. 11, 2010.

Office Communication, issued in U.S. Appl. No. 11/746,953, mailed Feb. 25, 2010.

Office Communication issued in Canadian Patent Application No. 2,651,960, dated Dec. 12, 2011.

Office Communication issued in Japanese Patent Application No. 2009-510186, dated Oct. 25, 2011. (English summary provided).

* cited by examiner

MULTI-LAYERED SUPPORT SYSTEM

CROSS-REFERENCES TO RELATED APPLICATIONS

This application is a continuation of currently pending U.S. patent application Ser. No. 11/746,953 filed May 10, 2007, which claims priority to U.S. Provisional Patent Application No. 60/799,526, filed May 11, 2006 and U.S. Provisional Patent Application No. 60/874,210, filed Dec. 11, 2006. The entire text of each of the above-referenced disclosures is specifically incorporated herein by reference without disclaimer.

FIELD OF THE INVENTION

The present disclosure relates generally to support surfaces for independent use and for use in association with beds and other support platforms, and more particularly but not by way of limitation to support surfaces that aid in the prevention, reduction, and/or treatment of decubitus ulcers and the transfer of moisture and/or heat from the body.

BACKGROUND

Patients and other persons restricted to bed for extended periods incur the risk of forming decubitus ulcers. Decubitus ulcers (commonly known as bed sores, pressure sores, pressure ulcers, etc.) can be formed when blood supplying the capillaries below the skin tissue is interrupted due to external pressure against the skin. This pressure can be greater than the internal blood pressure within a capillary and thus, occlude the capillary and prevent oxygen and nutrients from reaching the area of the skin in which the pressure is exerted. Moreover, moisture and heat on and around the person can exacerbate ulcers by causing skin maceration, among other associated problems.

SUMMARY

Exemplary embodiments of the present disclosure are directed to apparatus, systems and methods to aid in the prevention of decubitus ulcer formation and/or promote the healing of such ulcer formation. Certain exemplary embodiments comprise a multi-layer cover sheet can be utilized to aid in the removal of moisture, vapor, and heat adjacent and proximal the patient surface interface and in the environment surrounding the patient. Certain exemplary embodiments provide a surface that absorbs and/or disperses the moisture, vapor, and heat from the patient, as well as an air mover to facilitate a flow of air through the surface. In addition, exemplary embodiments of the multi-layer cover sheet can be utilized in combination with a number of support surfaces or platforms to provide a reduced interface pressure between the patient and the cover sheet on which the patient is positioned. This reduced interface pressure can help to prevent the formation of decubitus ulcers.

Exemplary embodiments comprise: a first layer comprising a vapor permeable material; a second layer comprising a spacer material; a third layer, wherein the second layer is between the first layer and the third layer; and an air mover, wherein the air mover is configured to pull air through the spacer material and toward the air mover. In certain exemplary embodiments, the air mover is integral with the first layer or the third layer. In certain exemplary embodiments, the air mover is configured to provide less than about 2.0 cubic feet per minute of air flow at a differential pressure of less than about 6.0 mm H2O and to create noise levels of approximately 30.0 db-A during operation. In other exemplary embodiments, the first layer, the second layer, and the third layer each comprise a first end, a second end, a first side, and a second side; and the first layer and the third layer are bonded along the first end, the first side, and the second side. In other exemplary embodiments, the aperture is proximal to the first end of the second layer; and at least a portion of the second end of the first layer is not bonded to the second end of the third layer. In certain exemplary embodiments, the air mover moves air between the first and second ends of the second layer during operation and the air mover is a centrifugal fan. In still other exemplary embodiments, the air mover is configured to pull air or push air through the spacer material. In other exemplary embodiments, the first layer may comprise a center section and two side sections; and the center section has a higher vapor permeability rate than the two side sections. In exemplary embodiments the spacer material comprises one of the following: open cell foam; natural or synthetic polymer particles, filaments, or strands; cotton fibers; polyester fibers; flexible metals and metal alloys; shape memory metals and metal alloys, and shape memory plastics. In still other exemplary embodiments, a zipper is coupled to either the first layer or the third layer. In certain exemplary embodiments, an antimicrobial device is proximal to the air mover.

Other exemplary embodiments may comprise: a flexible spacer material, a shell, and an air mover, wherein: the flexible spacer material is at least partially encased in the shell; a first portion of the shell is vapor permeable; and the air mover is in fluid communication with a first aperture in the shell and the air mover is configured to draw air through the spacer material. In certain exemplary embodiments, the air mover is integral with the shell. In other exemplary embodiments, a second portion of the shell is liquid impermeable and the shell comprises a second aperture distal from the first aperture, and the second aperture is open to the environment. In still other exemplary embodiments, the air mover moves air between the first aperture and the second aperture and the spacer material comprises one of the following: open cell foam; natural or synthetic polymer particles, filaments, or strands; cotton fibers; polyester fibers; flexible metals and metal alloys; shape memory metals and metal alloys, and shape memory plastics. In other exemplary embodiments, a zipper is coupled to the shell. In still other exemplary embodiments, a antimicrobial device is proximal to the air mover. In certain exemplary embodiments, the flexible spacer material is configured to permit air to flow through the flexible spacer material while the flexible spacer material supports a person laying on the support system.

Other exemplary embodiments comprise a method of removing moisture vapor from a person, the method comprising: providing a support surface to support the person; and providing a cover sheet between the support surface and the person, wherein the cover sheet may comprise: a vapor permeable material proximal to the person; a spacer material between the vapor permeable material and the support surface; and an air mover configured to push or pull air through the spacer material.

Other exemplary embodiments comprise a support system for supporting a person, the support system comprising: an upper portion comprised of a first spacer material that allows air to flow through the upper portion; a lower portion comprised of a second material that is air impermeable; an aperture in the second material; and an air mover configured to move air through the aperture and the first material. In other exemplary embodiments, the upper portion comprises a cover sheet that is vapor permeable, liquid impermeable and either air permeable or impermeable. In still other exemplary embodiments, the lower portion comprises a support material that permits air to flow through the support material while the support material supports a person laying on the support system. In certain exemplary embodiments, the lower portion further comprises a material that is vapor impermeable, air impermeable, and liquid impermeable, and the support material is between the second material and the material that is vapor impermeable, air impermeable, and liquid impermeable. In other exemplary embodiments, the aperture comprises a substantially circular hole or slit in the second material and the aperture is located near a torso or foot region of the lower portion. In certain embodiments, the air mover pulls or pushes air through the first spacer material and through the aperture.

Other exemplary embodiments comprise: a cover sheet; a support member; and an air mover comprising an air inlet and an air outlet, wherein the air inlet is coupled to the cover sheet and the air outlet is coupled to the support mattress. In embodiments where the air mover is used to inflate an air support mattress or direct air through an antimicrobial filter, the air pressure and flow produced by the air mover may be greater than other embodiments that do not include an air support mattress or antimicrobial filter. In certain exemplary embodiments, the cover sheet comprises a first layer that is moisture vapor permeable, water impermeable and either permeable or impermeable to air; the cover sheet comprises a second layer that is an open, flexible material; and the cover sheet comprises a third layer that is air, water, and moisture impermeable. In other exemplary embodiments, the air mover is configured to draw air through the cover sheet and exhaust air into the support mattress. In certain exemplary embodiments, the air mover is external to the support member, while in other exemplary embodiments, the air mover is integral to the support member.

Certain exemplary embodiments comprise: a vapor permeable upper portion; a lower portion comprising a spacer material encased within a shell; and an air mover that is integral with the shell. Certain exemplary embodiments also comprise a support mattress, wherein the lower portion is between the vapor permeable upper portion and the support mattress and a shell that is liquid impermeable. Other embodiments comprise an opening proximal to the vapor permeable upper portion. In certain exemplary embodiments, the air mover is configured to draw air through a vapor permeable, air permeable upper portion and the spacer material, while in other exemplary embodiments the air mover is configured to exhaust air through the spacer material and through a vapor permeable air permeable upper portion. In other embodiments, the upper portion is not air permeable, and the air flow is provided by an opening in the shell.

Certain exemplary embodiments comprise: a first layer formed of a vapor permeable material; a second layer formed of a flexible material, the flexible material to facilitate at least a flow of a vapor entering the second layer through the first layer; and a third layer formed of a liquid impermeable, gas impermeable, and vapor impermeable material. Specific exemplary embodiments also comprise an elongate member extending from a first side toward a second side of the multi-layer cover sheet, the elongate member to facilitate a flow of air through the elongate member and at least the second layer. In certain exemplary embodiments, the second layer includes a first, second, and third sub-layer, the first and the third sub-layer comprising an attachment surface configured to attach to the second sub-layer. In specific exemplary embodiments, the second sub-layer has a higher permeability to air than the first and the third sub-layers. Certain exemplary embodiments comprise a source of negative or positive pressure to move air and the vapor inside and outside the multi-layer cover sheet. In certain exemplary embodiments, the material forming the first layer is also liquid impermeable and air impermeable. In certain exemplary embodiments, the material forming the first, second, and third layers includes a one-time use material for single patient use applications, while in other exemplary embodiments, the material forming the first, second, and third layers includes a multi-use material for multi-patient use applications.

BRIEF DESCRIPTION OF THE DRAWINGS

While exemplary embodiments of the present invention have been shown and described in detail below, it will be clear to the person skilled in the art that changes and modifications may be made without departing from the scope of the invention. As such, that which is set forth in the following description and accompanying drawings is offered by way of illustration only and not as a limitation. The actual scope of the invention is intended to be defined by the following claims, along with the full range of equivalents to which such claims are entitled.

In addition, one of ordinary skill in the art will appreciate upon reading and understanding this disclosure that other variations for the invention described herein can be included within the scope of the present invention. For example, portions of the support system shown and described may be incorporated with existing mattresses or support materials. Other embodiments may utilize the support system in seating applications, including but not limited to, wheelchairs, chairs, recliners, benches, etc.

In the following Detailed Description of Disclosed Embodiments, various features are grouped together in several embodiments for the purpose of streamlining the disclosure. This method of disclosure is not to be interpreted as reflecting an intention that exemplary embodiments of the invention require more features than are expressly recited in each claim. Rather, as the following claims reflect, inventive subject matter lies in less than all features of a single disclosed embodiment. Thus, the following claims are hereby incorporated into the Detailed Description of Disclosed Embodiments, with each claim standing on its own as a separate embodiment.

Figure 1:
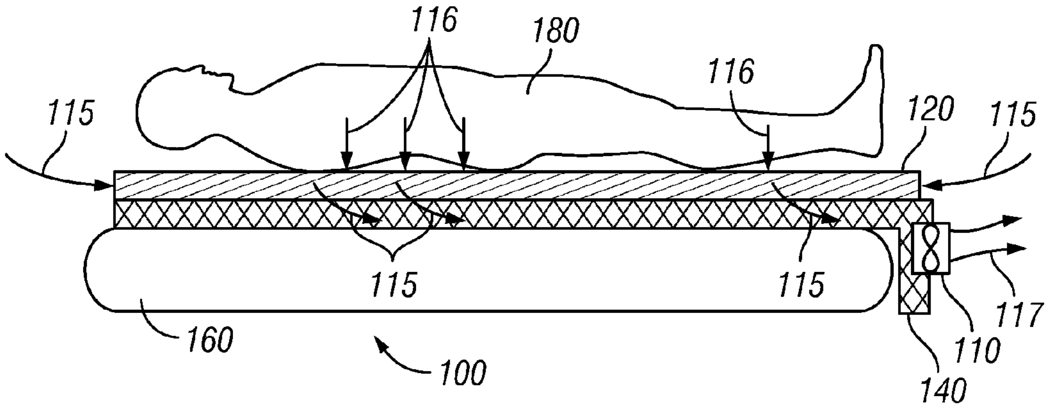

FIG. 1 illustrates a cross-sectional side view of a first exemplary embodiment of a support system for supporting a person.

Figure 2:
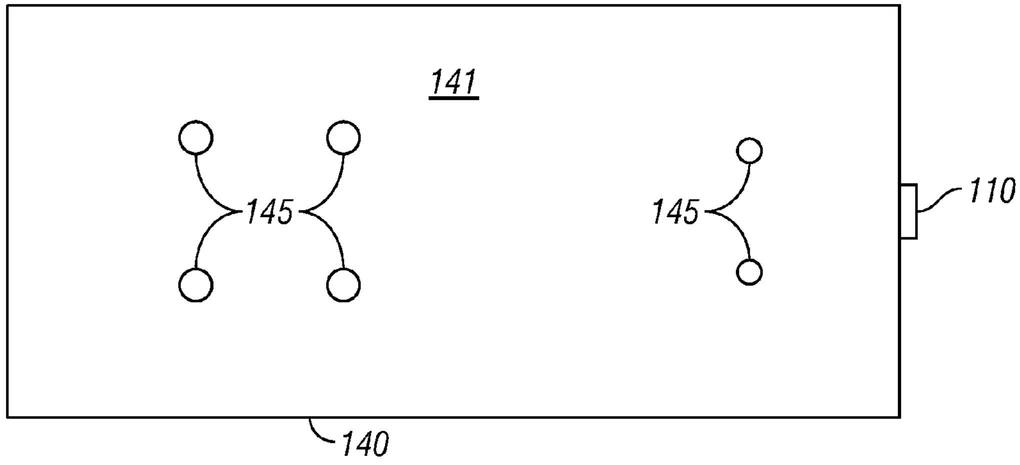

FIG. 2 illustrates a top view of the lower section of the exemplary embodiment of FIG. 1.

Figure 2A:
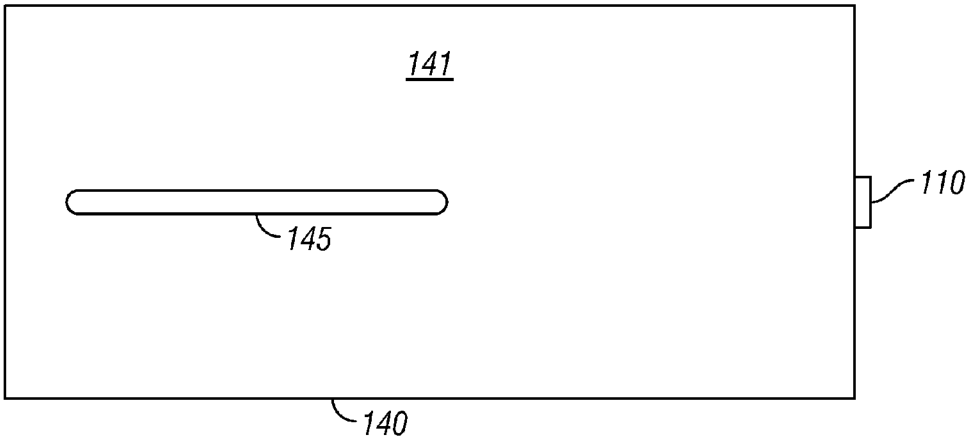

FIG. 2A illustrates a top view of a second exemplary embodiment of a lower section.

Figure 3:
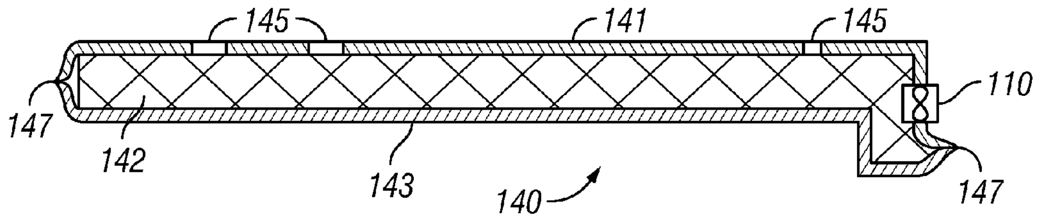

FIG. 3 illustrates a cross-sectional side view of the lower section of the exemplary embodiment of FIG. 1.

Figure 4:
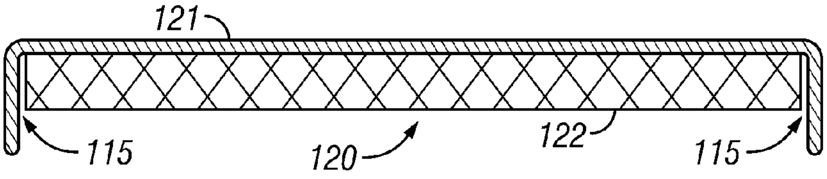

FIG. 4 illustrates a cross-sectional side view of the upper section of the exemplary embodiment of FIG. 1.

Figure 5:
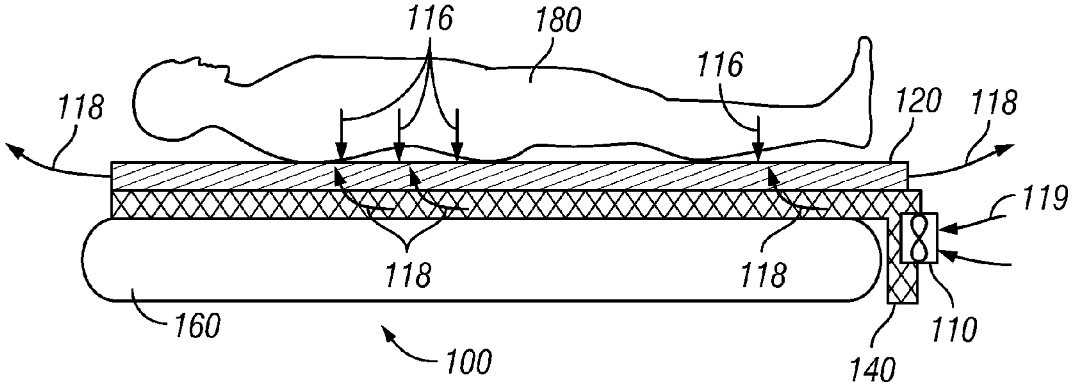

FIG. 5 illustrates a cross-sectional side view of a second exemplary embodiment of a support system for supporting a person.

Figure 6:
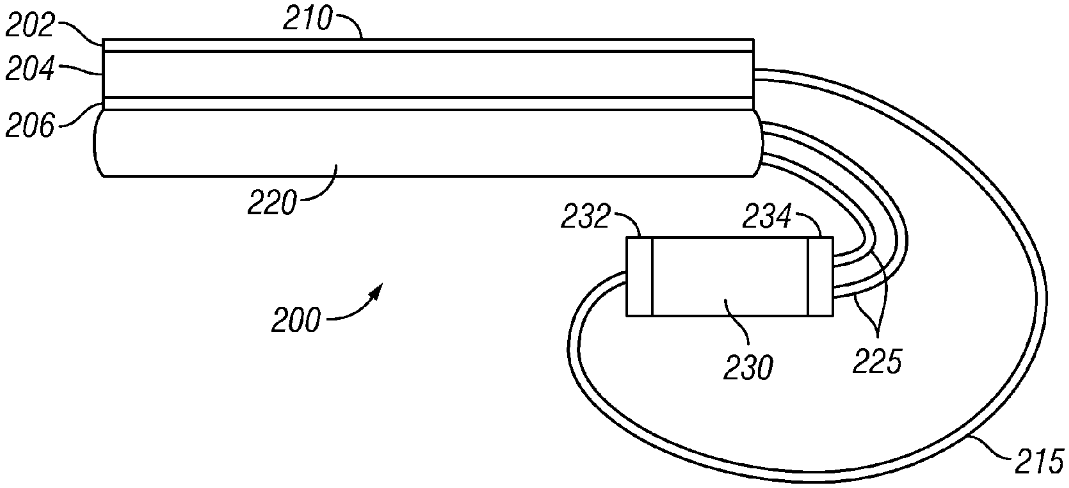

FIG. 6 illustrates a side view of a third exemplary embodiment of a support system for supporting a person.

Figure 7:
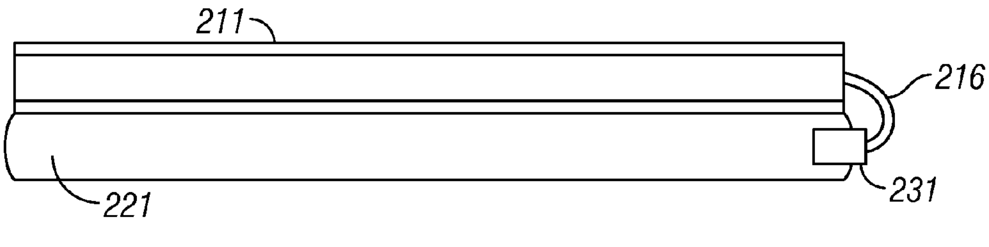

FIG. 7 illustrates a side view of a fourth exemplary embodiment of a support system for supporting a person.

Figure 8:
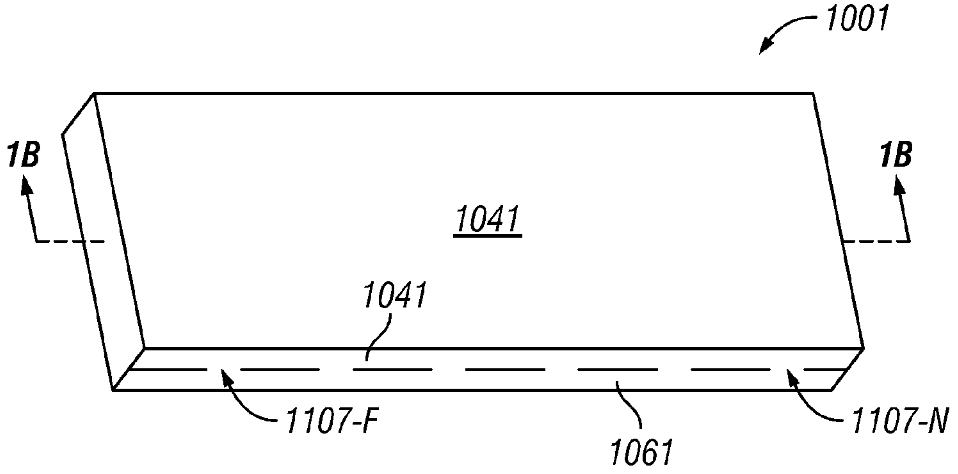

FIG. 8 illustrates a perspective view of an exemplary embodiment of a multi-layer cover sheet.

Figure 9:
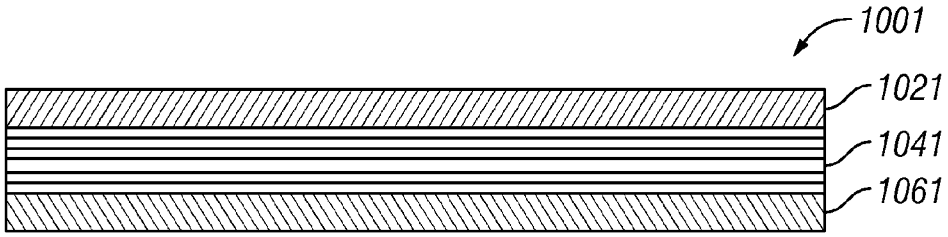

FIG. 9 illustrates a cross-sectional view of the exemplary embodiment of FIG. 8.

Figure 10:
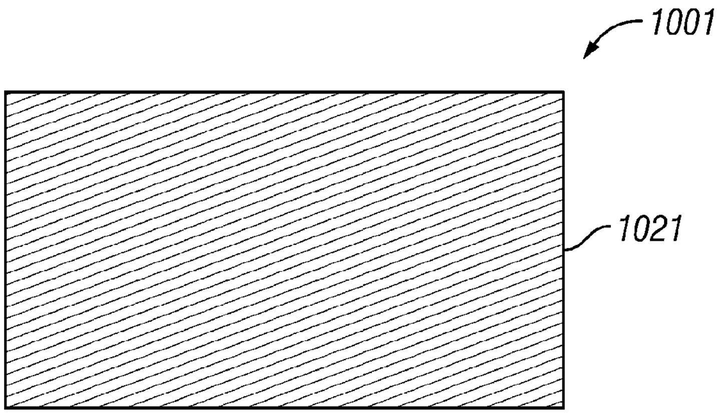

FIG. 10 illustrates a top down view of the first layer of the multi-layer cover sheet illustrated in FIGS. 8 and 9.

Figure 11:
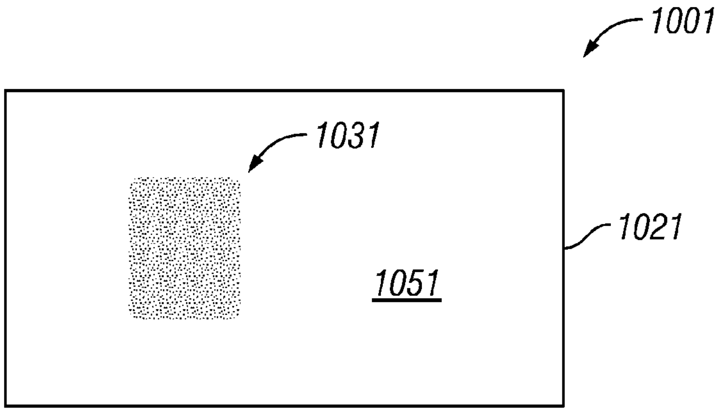
Figure 12:
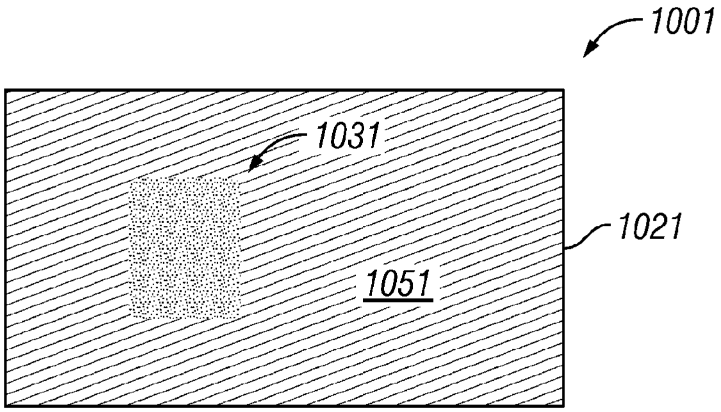
Figure 13A:
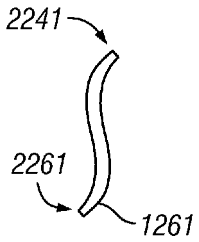
Figure 13B:
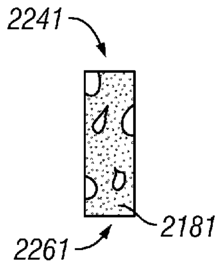
Figure 13C:
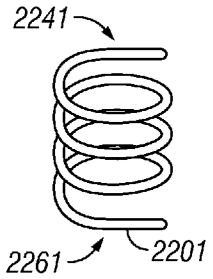
Figure 13D:
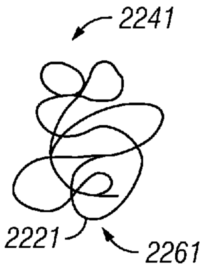

FIGS. 11 and 12 illustrate top views of various exemplary embodiments of the first layer of the cover sheet illustrated in FIGS. 8-10.

FIGS. 13A-13D illustrate various exemplary embodiments of a flexible material of a multi-layer cover sheet.

FIGS. 14A-14D illustrate various exemplary embodiments of the second layer of the multi-layer cover sheet.

Figure 15A:
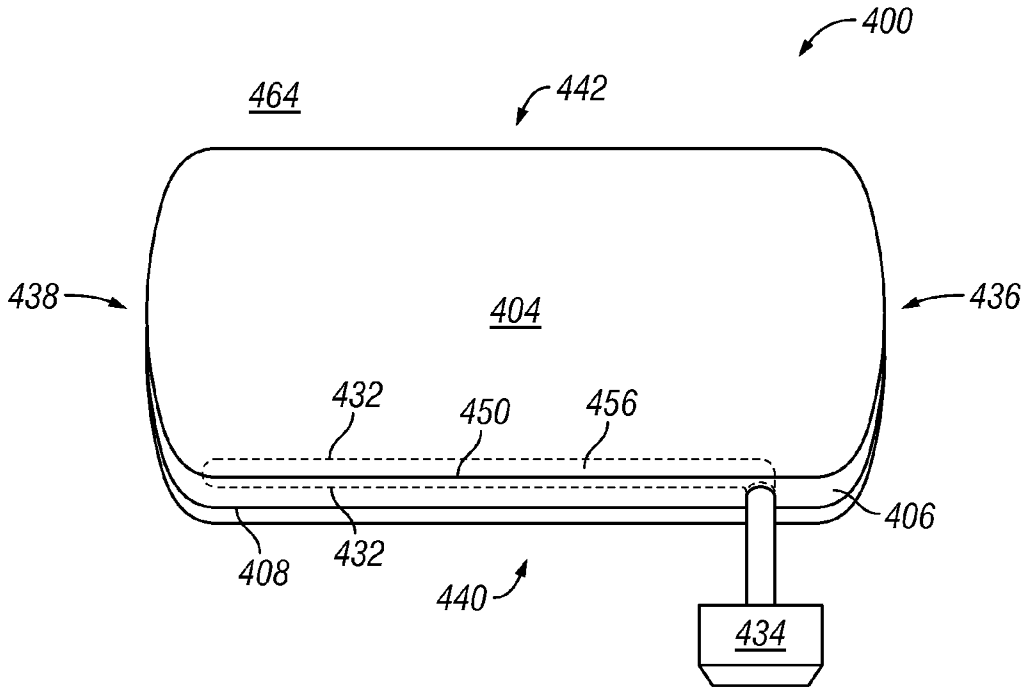

FIGS. 15A-115C illustrate various exemplary embodiments of the multi-layer cover sheet.

Figure 16A:
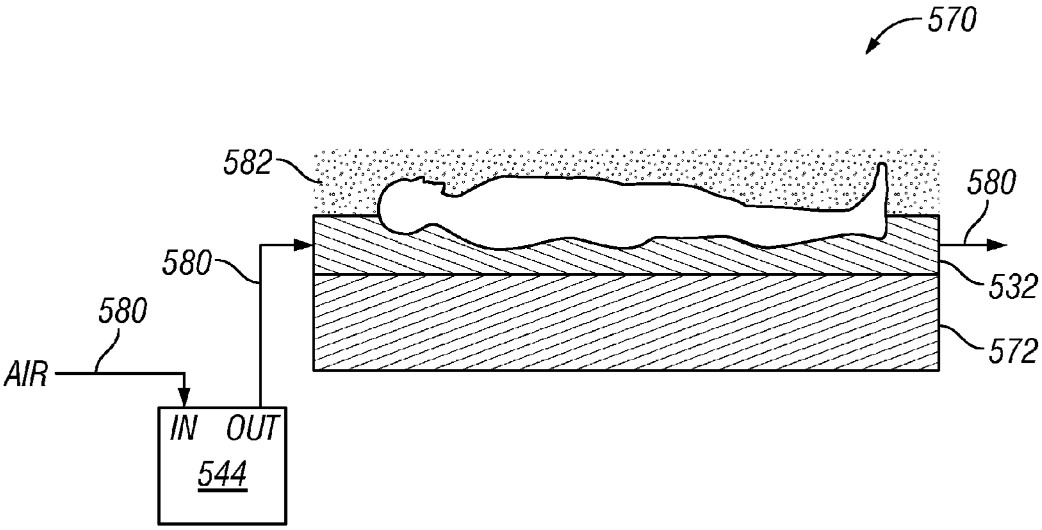
Figure 16B:
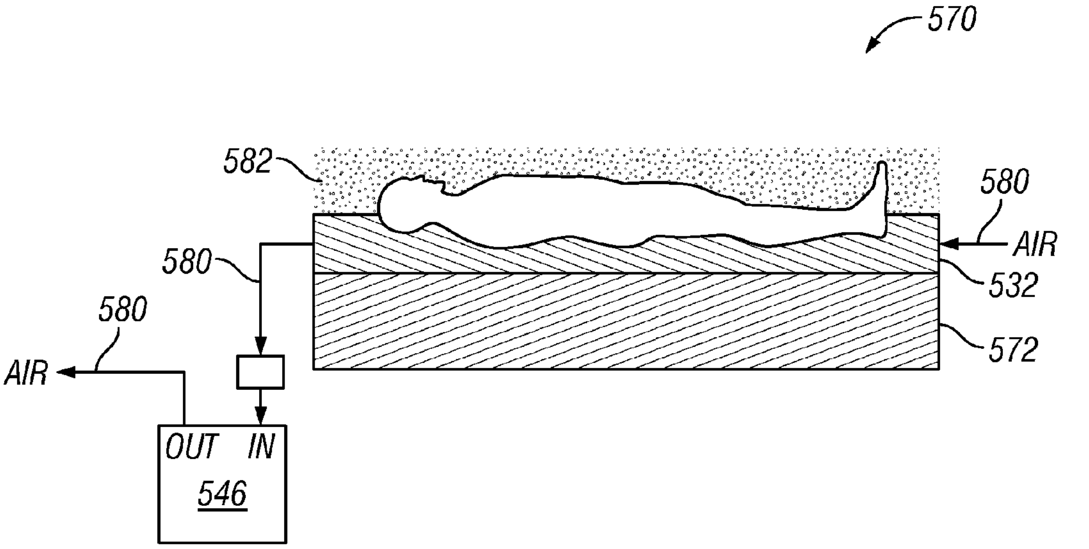

FIGS. 16A and 16B illustrate various exemplary embodiments of a system of the present disclosure.

Figure 17:
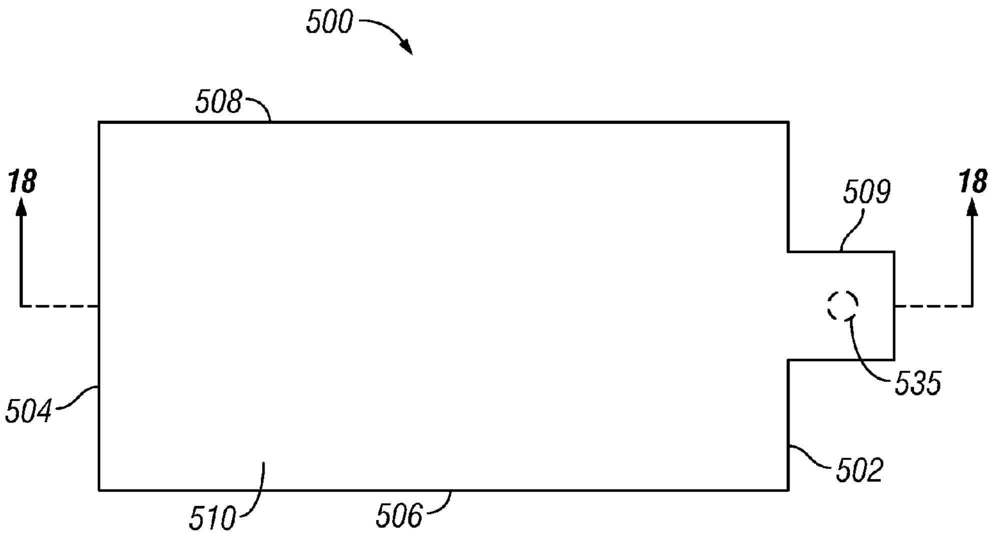

FIG. 17 illustrates a top view of an exemplary embodiment of the present disclosure.

Figure 18:
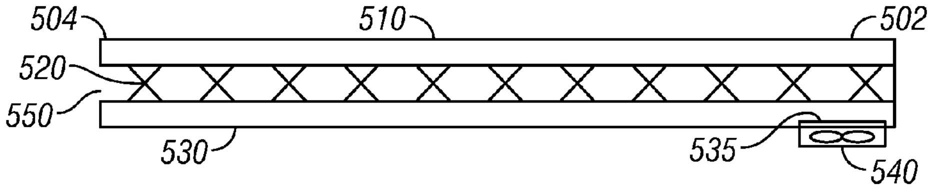

FIG. 18 illustrates a side view of the exemplary embodiment of FIG. 17.

Figure 19:
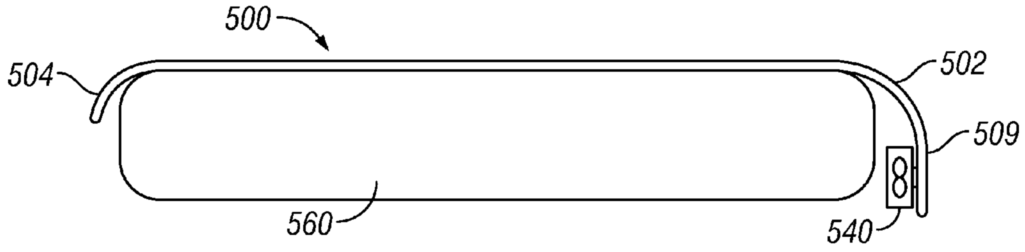

FIG. 19 illustrates a side view of an exemplary embodiment of the present disclosure.

Figure 20:
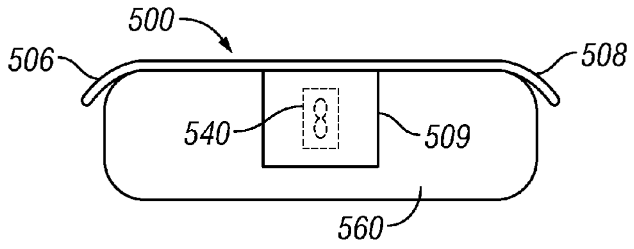

FIG. 20 illustrates an end view of the embodiment of FIG. 19.

Figure 21:
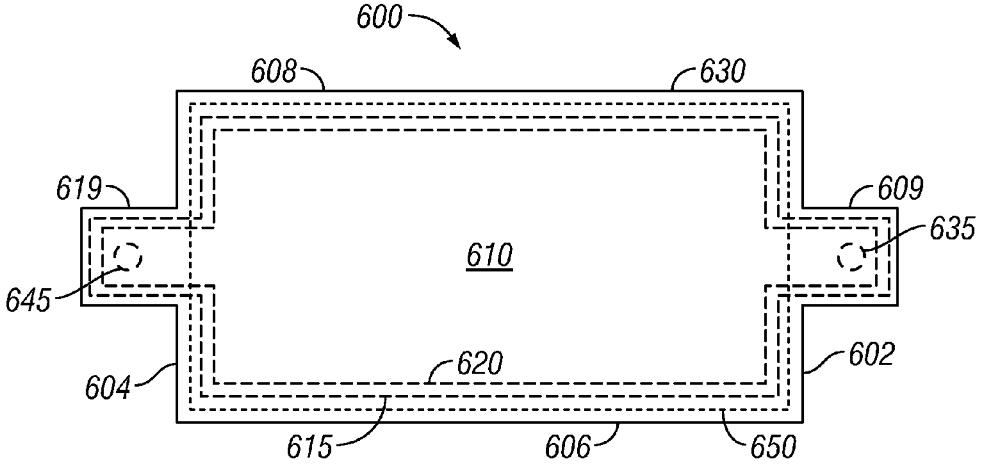

FIG. 21 illustrates a top view of an exemplary embodiment of the present disclosure.

Figure 22:
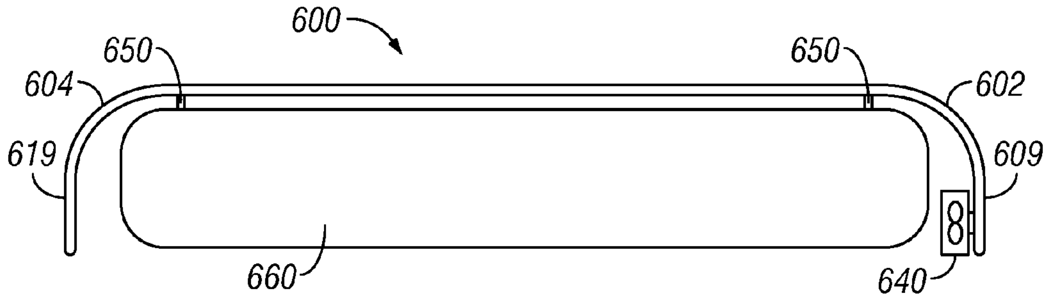

FIG. 22 illustrates a side view of an exemplary embodiment of the present disclosure.

Figure 23:
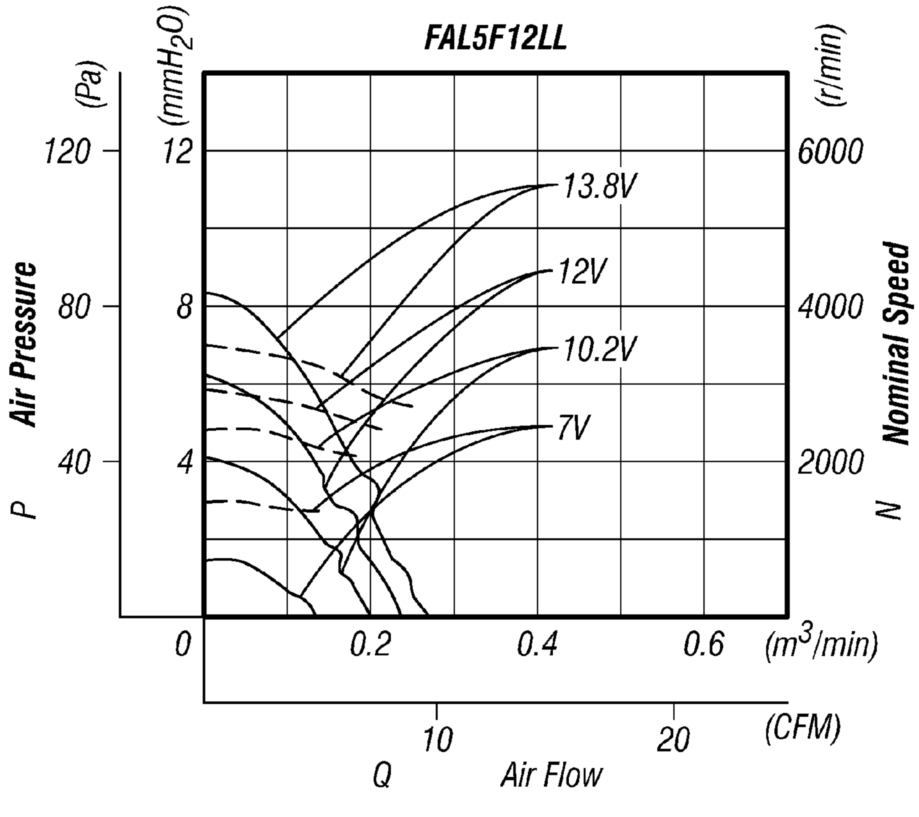

FIG. 23 illustrates a graph of operating data for a component of an exemplary embodiment of the present disclosure.

DETAILED DESCRIPTION OF EXEMPLARY EMBODIMENTS

Exemplary embodiments of the present disclosure are directed to apparatus, systems and methods to aid in the prevention of decubitus ulcer formation and/or promote the healing of such ulcer formation. For example, in various embodiments, preventing ulcer formation and/or healing decubitus ulcers can be accomplished through the use of a multi-layer cover sheet. Exemplary embodiments of the multi-layer cover sheet can be utilized to aid in the removal of moisture, vapor, and heat adjacent and proximal the patient surface interface and in the environment surrounding the patient by providing a surface that absorbs and/or disperses the moisture, vapor, and heat from the patient. In addition, the exemplary embodiments of the multi-layer cover sheet can be utilized in combination with a number of support surfaces or platforms to provide a reduced interface pressure between the patient and the cover sheet on which the patient is positioned. This reduced interface pressure can help to prevent the formation of decubitus ulcers.

In various exemplary embodiments, the multi-layer cover sheet may include a number of layers. Each layer may be formed of a number of different materials that exhibit various properties. These properties may include the level of friction or shear of a surface, the permeability of a vapor, a gas, a liquid, and/or a solid, and various phases of the vapor, the gas, the liquid, and the solid, and other properties.

For example, in exemplary embodiments, the multi-layer cover sheet may include materials that provide for a low air loss feature, where one or more layers exhibit various air, vapor, and liquid permeable properties and/or where one or more layers are fastened together along various portions of a perimeter of the multi-layer cover sheet to define openings through which air can move from inside to outside the multi-layer cover sheet, as will be described herein. As used herein, a low air loss feature of a multi-layer cover sheet includes, but is not limited to: a multi-layer cover sheet that allows air and vapor to pass through the first layer in the presence of a partial pressure difference in vapor between the internal and external environments of the multi-layer cover sheet; a multi-layer cover sheet that allows air and vapor to pass through the first layer in the absence of a partial pressure difference in vapor between the internal and external environments of the multi-layer cover sheet; and a multi-layer cover sheet that allows air and vapor to move into and/or out of the multi-layer cover sheet through the openings defined by portions of the perimeter that are fastened together.

In other exemplary embodiments, the multi-layer cover sheet can include materials that provide for substantially no air flow, where one or more layers include air impermeable properties and/or where layers are partially fastened together along the perimeter of the multi-layer coversheet. In such exemplary embodiments, this configuration may control the direction of movement of air from inside to outside (e.g., under influence by a source of positive pressure) and from outside to inside (e.g., under influence by a source of negative pressure) the multi-layer cover sheet. Certain exemplary embodiments comprise a multi-layer cover sheet includes, but is not limited to, the following: a cover sheet that prevents or substantially prevents air from passing through the first layer, but allows for the passing of vapor through the first layer; a cover sheet that prevents or substantially prevents air from moving through the first layer in the presence of a partial vapor pressure difference between the internal and external environments of the multi-layer cover sheet, but allows for the passing of vapor through the first layer; and a cover sheet that prevents or substantially prevents air from moving out of the multi-layer cover sheet via the material forming a particular layer of the cover sheet, but allows air to move through the openings defined by portions of the perimeter of the multi-layer cover sheet that are fastened together.

In various exemplary embodiments, the multi-layer coversheet can include an elongate member extending from a side of the multi-layer cover sheet toward a different side of the multi-layer cover sheet. In exemplary embodiments, the elongate member can be in fluid communication with a source to move air inside and outside the multi-layer cover sheet. In some exemplary embodiments, the source to move air can include a source of positive pressure. In other exemplary embodiments, the source to move air can include a source of negative pressure or reduced pressure.

In various exemplary embodiments, systems are provided that can include a number of components that both aid in prevention of decubitus ulcer formation and to remove moisture and/or heat from the patient. For example, systems can include a multi-layer cover sheet that can be used in conjunction with a variety of support surfaces, such as an inflatable mattress, a foam mattress, a gel mattress, a water mattress, or a RIK® Fluid Mattress of a hospital bed. In such exemplary embodiments, features of the multi-layer cover sheet can help to remove moisture from the patient and to lower interface pressure between a patient and the surface of the multi-layer cover sheet, while features of the inflatable or foam mattress can aid in the prevention and/or healing of decubitus ulcers by further lowering interface pressures at areas of the skin in which external pressures are typically high, as for example, at bony prominences such as the heel and the hip area of the patient. In other exemplary embodiments, systems can include the multi-layer cover sheet used in conjunction with a chair or other support platform.

FIG. 1 discloses a general cross-section side view of upper section 120 and lower section 140. As shown in FIG. 1, a support system 100 comprises an upper section 120, a lower section 140, and an air mover 110. In the embodiment shown, support system 100 is placed on top of a support mattress 160, which supports a person 180. Subsequent figures present a more detailed view of the features of each section.

FIG. 2 shows a top plan view of lower section 140 without upper section 120 in place, while FIG. 3 shows a detailed cross-section side view of lower section 140. In the embodiment shown in FIG. 3, lower section 140 comprises a first layer 141, a second layer 142, and a third layer 143. In this embodiment, first layer 141 is comprised of a material that is liquid and air impermeable and either vapor permeable or vapor impermeable. One example of such vapor permeable material is sold under the trade name GoreTex.™ GoreTex™ is vapor permeable and liquid impermeable, but may be air permeable or air impermeable. Examples of such vapor impermeable materials include sheet vinyl or sheet urethane. In the embodiment shown, second layer 142 is a spacer material that allows separates first layer 141 and third layer 143. As used in this disclosure, the term "spacer material" (and related terms) should be construed broadly to include any material that includes a volume of air within the material and allows air to move through the material. In exemplary embodiments, spacer materials allow air to flow through the material when a person is laying on the material while the material is supported by a mattress. Examples of such spacer materials include open cell foam, polymer particles, and a material sold by Tytex under the trade name AirX™. Additional examples and features of spacer materials are disclosed in the description of second layers 1041 and 3041 in FIGS. 8-10 and 14B below. In the exemplary embodiment shown, third layer 143 comprises a material that is vapor impermeable, air impermeable, and liquid impermeable. Examples of such material include sheet vinyl plastic or sheet polyurethane material. In certain embodiments, first layer 141 and third layer 143 are connected at an interface 147 via a process such as radio frequency welding, heat sealing, sonic welding, or other comparable techniques. First layer 141 and third layer 143 may be comprised of the same material in certain embodiments.

As shown in FIGS. 2, 2A and 3, first layer 141 comprises one or more apertures 145. Apertures 145 may be of various configurations, shapes and sizes. For example, apertures 145 may be slits or holes, and may be spaced in various configurations across first layer 141. In the embodiment shown in FIG. 2A, first layer 141 may comprise an aperture 145 that is a single slit, while the exemplary embodiment shown in FIG. 2 discloses substantially circular holes. In certain exemplary embodiments, aperture 145 may be configured as a slit that is long enough to insert or remove spacer material 142 (described below) through aperture 145.

Referring now to FIG. 4, a cross-section side view of upper section 120 is shown. In the exemplary embodiment shown, upper section 120 comprises spacer material 122 and a cover sheet 121. Spacer material 122 may be comprised of material equivalent to second layer 142 of lower section 140 (shown in FIG. 3). In the exemplary embodiment shown, spacer material 122 is comprised of an material that can support the weight of person 180 and still allow air flow to pass through spacer material 122 (while person 180 is laying on upper section 120 and upper section 120 is supported by a mattress). In the exemplary embodiment of FIG. 4, cover sheet 121 is comprised of a material that is vapor permeable, liquid impermeable and either air permeable or impermeable. One example of such a material is GoreTex.™ In other embodiments, cover sheet 121 can be vapor permeable, liquid permeable, and air permeable, such as a common bed sheet.

Referring back to FIG. 1, support system 100 provides support for person 180 and aids in the removal of moisture, vapor and heat adjacent and proximal the interface between person 180 and support system 100. In the exemplary embodiment of FIG. 1, support system 100 comprises air mover 110 that is integral with lower section 140. In other exemplary embodiments, air mover 110 may be external to lower section 140 with appropriate connecting members such as tubing, piping or duct work, etc. In certain exemplary embodiments, air mover 110 may comprise a guard or other partition (not shown) to prevent material from lower section 140 or the surrounding environment from blocking the inlet or outlet of air mover 110. During operation, air mover 110 shown in FIG. 1 operates to reduce pressure within lower section 140 and create a suction air flow 115 that is drawn through upper section 120 and lower section 140. Air mover 110 then exhausts air flow 117 into the surrounding environment.

In the exemplary embodiments shown in FIGS. 1-4, moisture vapor 116 is transferred from person 180 (and the air adjacent person 180) through cover sheet 121 to air pockets within spacer material 122 of upper section 120. Moisture vapor 116 will continue to transfer to air pockets within spacer material 122 while the air pockets are at a lower relative humidity than the air adjacent person 180. As the relative humidity of the air pockets increases and approaches the relative humidity of the air adjacent person 180, the transfer rate of moisture vapor 116 will decrease. It is therefore desirable to maintain a lower relative humidity of the air pockets within spacer material 122 than the relative humidity of the air adjacent person 180. As moisture vapor 116 is transferred to air pockets within spacer material 122, it is therefore desirable to remove moisture vapor from the air pockets and lower the relative humidity of the air within spacer material 122. By removing moisture vapor 116 from the air within spacer material 122, the transfer rate of moisture vapor 116 from person 180 can be maintained at a more uniform level.

In the exemplary embodiment shown in FIG. 1, suction air flow 115 flows through the air pockets within spacer material 122 and assists in removing moisture vapor 116 from the air pockets. This lowers the relative humidity of the air pockets and allows the transfer rate of moisture vapor 116 to be maintained over time. As shown in FIG. 4, suction air flow 115 may enter the air space within spacer material 122 by flowing between cover sheet 121 and spacer material 122. In certain embodiments, suction air flow 115 may also flow through cover sheet 121. In the embodiment shown in FIG. 1, suction air flow 115 also travels through apertures 145 of first layer 141, through second layer 142 and exits from air mover 110 as exhaust air flow 117.

In the exemplary embodiments shown in FIGS. 1-4, apertures 145 are located proximal to person 180, which may potentially increase the moisture vapor 116 transfer created by a given suction air flow 115. The localization of suction air flow 115 to areas adjacent or proximal to person 180 (and particularly in areas where moisture vapor 116 is more prevalent), reduces the rate of suction air flow 115 for a required rate of moisture vapor 116 transfer. For example, if suction air flow 115 were allowed to pass through the entire first layer 141 (rather than restricted to apertures 145), the amount of suction air flow 115 for a given transfer rate of moisture vapor 116 from person 180 could be increased. However, with apertures 145 restricting suction air flow 115 to specific areas adjacent or proximal person 180, the rate of suction air flow 115 may be reduced while the desired transfer rate of moisture vapor 116 is maintained. In certain exemplary embodiments, a desired transfer rate of moisture vapor 116 is maintained with a suction air flow 115 rate of approximately 1 cubic foot per minute.

The reduction in the amount of suction air flow 115 for a given transfer rate of moisture vapor 116 reduces the size required for the air mover 110. A sufficient reduction in the size of air mover 110 may allow for air mover 110 to be placed in locations that would otherwise not be possible. In one embodiment, air mover 110 is a 12 volt DC, 40 mm box fan such as a Sunon KDE 1204 PKBX-8. By utilizing an air mover such as the Sunon model (or other similarly-sized devices), air mover 110 can be placed integral to lower section 140, allowing for a more compact overall design of support system 100. Air mover 110 may be coupled to lower section 140 with a substantially airtight seal so that air does not flow around air mover 110 as the air enters or exits lower section 140. As shown in the embodiment of FIG. 1, air mover 110 may be incorporated into an area of lower section 140 that is near the end of support mattress 160. By placing air mover 110 in a location that is not between support mattress 160 and patient 180, the comfort of patient 180 should not be adversely affected. In other embodiments, air mover 110 may be placed in other areas of lower section 140. For example, in embodiments where air mover 110 is sufficiently small, air mover 110 may be placed between patient 180 and support mattress 160 without adversely affecting the comfort of patient 180.

A decrease in the required suction air flow 115 can also reduce the amount of energy required to operate air mover 110, thereby reducing operating costs for support system 100. Reduced energy requirements and suction air flow 115 for air mover 110 can also reduce the amount of noise and heat generated by air mover 110. A reduction in noise and heat can provide a more comfortable environment for person 180, who may use support system 100 for extended periods of time.

A reduction in the size of air mover 110 may also lead to a reduction in the cost of air mover 110. In certain embodiments, the cost of air mover 110 may be low enough for air mover 110 to be a disposable item. In addition, upper section 120 and lower section 140 can be configured to be disposable or reusable. In exemplary embodiments comprising reusable upper section 120 and lower section 140, the sections can be configured so that they may be washed for disinfection. Additionally, in certain embodiments lower portion 140 and upper portion 120 can be attached to each other through various fastening means, such as straps, snaps, buttons, or hook and loop fasteners.

In certain exemplary embodiments, apertures 145 are located and sized so that the apertures 145 are concentrated near the torso or trunk of person 180 (i.e., the torso region of lower section 140). Such a configuration may be desirable if person 180 is more likely to produce more moisture vapor 116 in the torso region. Apertures 145 may also be located near the feet of person 180 (i.e., the foot region of lower section 140). Apertures 145 may also include additional openings near other areas of person 180 that are likely to produce moisture vapor 116.

In certain exemplary embodiments, support mattress 160 and lower portion 140 are approximately the same width and length. In other exemplary embodiments, lower portion 140 may be narrower or shorter than support mattress 160. For example, lower portion 140 may be dimensioned so that apertures 145 are placed near the perimeter of lower portion 140 and underneath patient 180. In certain exemplary embodiments, apertures 145 may also be placed only near the center of lower portion 140. In still other exemplary embodiments, apertures 145 may be placed both near the center of lower portion 140 and near the perimeter of lower portion 140.

Support mattress 160 can be any configuration known in the art for supporting person 180. For example, in certain exemplary embodiments, support mattress 160 may be an alternating-pressure-pad-type mattress or other type of mattress utilizing air to inflate or pressurize a cell or chamber within the mattress. In other exemplary embodiments, support mattress 160 does not utilize air to support person 180.

Referring now to FIG. 5, another exemplary embodiment of support system 100 is shown in partial cross-section. This exemplary embodiment is equivalent to the embodiment disclosed in FIGS. 1 through 4, with the exception that the orientation of air mover 131 is reversed so that suction air flow 119 is pulled from the surrounding environment and exhaust air flow 118 is pushed through lower section 140 and upper section 120. Apertures 145 reduce the amount of exhaust air flow 118 needed to achieve the desired transfer rate of moisture vapor 116. In the exemplary embodiment shown in FIG. 5, moisture vapor 116 is transferred from person 180 through cover sheet 121 and to air pockets within spacer material 122 in the manner described above with respect to FIG. 1. In the embodiment of FIG. 5, however, exhaust air flow 118 flows through air pockets in spacer material 122 and removes moisture vapor 116. In the exemplary embodiment shown, a portion of exhaust air flow 118 exits upper section 120 by flowing through the space between the perimeter of spacer material 122 and cover sheet 121. A portion of exhaust air flow 118 may also flow through cover sheet 121.

Referring now to FIG. 6, an exemplary embodiment of a support system 200 comprises a multi-layer cover sheet 210, a support mattress 220, and an air mover 230. In certain exemplary embodiments, support mattress 220 is an air-inflated mattress. Air mover 230 comprises an air inlet 232 that is coupled to multi-layer cover sheet 210 via an inlet coupling member 215. Air mover 230 also comprises an air outlet 234 that is coupled to support mattress 220 via a pair of outlet coupling members 225. Inlet coupling member 215 and outlet coupling members 225 may be comprised of tubing, flexible piping, or any other apparatus that allows air to flow between air mover 230 and multi-layer cover sheet 210 or support mattress 220.

In the exemplary embodiment shown, outlet coupling members 225 are each coupled to separate chambers within support mattress 220. Therefore, the separate chambers can be pressurized individually to facilitate movement of a person supported by support mattress 220. Such a configuration is commonly known as an alternating pressure pad (APP). In other exemplary embodiments, support mattress 220 may only have a single chamber and air mover 230 may have a single outlet coupling member 225 between air mover 230 and support mattress 220. Support mattress 220 may therefore be an alternating pressure pad type mattress, or any other type of mattress utilizing air to inflate or pressurize a cell or chamber within the mattress. In certain exemplary embodiments, support mattress 220 may incorporate pulsation by utilizing multiple pressure zones with discrete base line pressures that alternate to pressures above and below the discrete base line pressure.

In the exemplary embodiment shown in FIG. 6, multi-layer cover sheet 210 is equivalent to a cover sheet 1001 described with respect to FIGS. 8-10 below. In the exemplary embodiment shown in FIG. 6, multi-layer cover sheet 210 comprises a first layer 202 formed from a vapor permeable material, a second layer 204 formed from a spacer material, and a third layer 206. In certain exemplary embodiments, third layer 206 is formed of a material that restricts air flow and directs the air flow air through the spacer material.

Support system 200 is configured so that during operation, air mover 230 draws air through multi-layer cover sheet 210 and through second layer 204 and also forces or pressurizes air into support mattress 220. By combining these functions, the costs, space requirements, electrical requirements, and heat generation are reduced as compared to embodiments that utilize separate air movers to draw air through a cover sheet and force air into a support mattress. Support system 200 therefore provides a compact and efficient system for inflating support mattress 220 and providing air flow for multi-layer cover sheet 210 used in conjunction with a support mattress.

In the exemplary embodiment shown in FIG. 6, air mover 230 is external to multi-layer cover sheet 210 and support mattress 220. In exemplary embodiments with an external air mover, the air mover may be conveniently mounted in an accessible location, such as the foot board of a bed frame supporting the cover sheet and support mattress.

FIG. 7 represents a side view of an exemplary embodiment. In this exemplary embodiment, air mover 231 is incorporated into the outer envelope or shell of support mattress 221. In the embodiment shown in FIG. 7, air mover 231 is integral to support mattress 221, thereby eliminating the need for coupling members between air mover 231 and support mattress 221. Because support mattress 221 is placed in close proximity to multi-layer cover sheet 211, the length of a coupling member 216 between air mover 231 and multi-layer cover sheet 211 may also be reduced. In the exemplary embodiment shown, air mover 231 is coupled to support mattress 221 with a substantially airtight seal so that air does not flow around air mover 231 as the air enters or exits support mattress 221. In still other exemplary embodiments (not shown), an integral air mover such as air mover 231 may be coupled to multiple outlet coupling members that are coupled to multiple chambers within support mattress 221.

FIGS. 8 and 9 illustrate a perspective view and a cross sectional view, respectively, of an exemplary embodiment of a multi-layer cover sheet 1001. FIG. 10 illustrates a top view of the first layer of the multi-layer cover sheet 1001 illustrated in FIGS. 8 and 9. FIGS. 11 and 12 illustrate top views of various embodiments of the first layer of the cover sheet illustrated in FIGS. 8-10. As best shown in FIG. 9, the multi-layer cover sheet 1001 includes three layers: a first layer 1021, a second layer 1041, and a third layer 1061. In various embodiments, the first, second, and third layers 1021, 1041, and 1061 each provide the multi-layer cover sheet 1001 with a variety of functions and properties, as will be described herein.

Multi-layer cover sheet 1001 illustrated in FIGS. 8-12 includes a rectangular shape. In other exemplary embodiments, the multi-layer cover sheet 1001 can include a number of other shapes including, but not limited to, circular, ovular, square, polygonal, and irregular shapes. In addition, each of the layers of multi-layer cover sheet 1001 can include varying lengths, widths, and heights. In some exemplary embodiments, for example, second layer 1041 can have a larger width than first and third layers 1021 and 1061, and in other exemplary embodiments, third layer 1061 can have a larger width than first and second layers 1021 and 1041.

In the exemplary embodiment illustrated in FIGS. 8-10, first layer 1021 is formed of a vapor permeable, air permeable, and liquid impermeable material, second layer 1041 is formed of a laterally air permeable flexible material, and third layer 1061 is formed of a vapor, air, and liquid impermeable material. The vapor permeable material of the first layer 1021 allows for moisture vapor, heat, and the like, to pass through the first layer 1021, in the form of vapor and/or air, and into second layer 1041 of the multi-layer cover sheet to thereby disperse and remove moisture and heat both from the patient and from the environment surrounding the patient, while preventing liquid from moving into the second layer 1041 via first layer 1021. In various embodiments, first layer 1021 can be formed such that all or a portion(s) of first layer 1021 is permeable to air, vapor, and/or liquid. For example, as shown in FIG. 10, all of first layer 1021 is permeable to vapor, but impermeable to air and liquid. In FIG. 11, a seat region 1031 of first layer 1021 is permeable to vapor and air, and a non-seat portion 1051 of first layer 1021 is not air and vapor permeable. In addition, in various exemplary embodiments, first layer 1021 can be formed such that some portions are more permeable to vapor, air, and/or liquid than other portions. As shown in FIG. 12, for example, seat region 1031 of first layer 1021 has a permeability that is greater than a permeability of non-seat region 1051 of the first layer 1021. As such, vapor and/or heat will transfer through first layer 1021 at a higher rate in seat region 1031 than a rate of vapor and/or heat transfer in non-seat regions 1051.

As one of ordinary skill in the art will appreciate, vapor and air can carry organisms such as bacteria, viruses, and other potentially harmful pathogens. As such, and as will be described in more detail herein, in some embodiments of the present disclosure, one or more antimicrobial devices, agents, etc., can be provided to prevent, destroy, mitigate, repel, trap, and/or contain potentially harmful pathogenic organisms including microbial organisms such as bacteria, viruses, mold, mildew, dust mites, fungi, microbial spores, bioslimes, protozoa, protozoan cysts, and the like, and thus, remove them from air and from vapor that is dispersed and removed from the patient and from the environment surrounding the patient. In addition, in various embodiments, the multi-layer cover sheet can include various layers having antimicrobial activity. In some embodiments, for example, first, second, and or third layers 1021, 1041, and 1061 can include particles, fibers, threads, etc., formed of silver and/or other antimicrobial agents. Other exemplary embodiments, including those disclosed in FIGS. 1-7 and 17-20 may also comprise antimicrobial agents.

The first layer 1021 can include properties other than those illustrated and described in FIGS. 8 and 9. For example, in various exemplary embodiments, first layer 1021 can be formed of a vapor permeable, and air and liquid impermeable material. In other embodiments, first layer 1021 can be formed of an air, liquid, and vapor permeable material. Other combinations of properties exhibited by materials forming first layer 1021 are also contemplated. One example of a material that can be used to form first layer 1021 that exhibits vapor permeability, liquid impermeability, and air permeability or impermeability includes a material under the trade name Gore-Tex®.

In various exemplary embodiments, second layer 1041 can be formed of various materials, and can have a number of configurations and shapes, as described herein. In some embodiments, the material is flexible. In such exemplary embodiments, the flexible material can include properties that resist compression, such that when the flexible material is compressed, for example, by the weight of a patient lying on the multi-layer cover sheet, the flexible material has a tendency to return toward its original shape, and thereby impart a supportive function to the multi-layer cover sheet. The flexible material can also include a property that allows for lateral movement of air through the flexible material even under compression.

Examples of materials that can be used to form second layer 1041 can include, but are not limited to, natural and synthetic polymers in the form of particles, filaments, strands, foam (e.g., open cell foam), among others, and natural and synthetic materials such as cotton fibers, polyester fibers, and the like. Other materials can include flexible metals and metal alloys, shape memory metals and metal alloys, and shape memory plastics. These materials can include elastic, super elastic, linear elastic, and/or shape memory properties that allow the flexible material to flex and bend and to form varying shapes under varying conditions (e.g., compression, strain, temperature, etc.).

FIGS. 13A-13D illustrate exemplary various embodiments of a flexible material of the multi-layer cover sheet. In various embodiments of FIGS. 13A-13D, the flexible material can include a number of cross-sectional geometric shapes, including but not limited to, circular, ovular, polygonal, and irregular geometric shapes. For example, as shown in FIGS. 13A-13D, the flexible material can include a strand member 2161, a foam member 2181, a coil member 2201, or a convoluted member 2221, or a combination thereof, each having a circular cross-sectional shape. Each of the embodiments illustrated in FIGS. 13A-13D, either alone, or in combination, can provide support to the patient lying on the multi-layer cover sheet, can aid in lowering interface pressures between the patient and the multi-layer cover sheet, and can permit air to flow under the patient, and can function in combination with a support platform or support surface, such as an air mattress, to further reduce interface pressures between the patient and multi-layer coversheet.

In each of FIGS. 13A-13D, the flexible material includes a first and a second end 2241 and 2261. In various exemplary embodiments, first and second ends 2241 and 2261 can include surfaces and/or structures that allow them to attach, connect, couple, hook, trap, and/or anchor to portions of the multilayer cover sheet to secure the flexible member to the cover sheet, as will be described in more detail with respect to FIG. 14A. In some exemplary embodiments, the flexible material forming second layer 1041, illustrated in FIG. 9 is not coupled to multi-layer cover sheet 1001, but rather is positioned between first and third layers 1021 and 1061 and secured therein by fastening first and third layers 1021 and 1061 together to thereby enclose second layer 1041, as will be described herein below.

In exemplary embodiments, the flexible material can also facilitate at least a flow of air through the second layer. For example, in various exemplary embodiments, the flexible material can include configurations that define openings, channels, and passages that allow for air, vapor, and liquid to flow through the second layer. In one exemplary embodiment, the flexible material can include a non-continuous configuration where individual components, such as individual strands or fibers, and other individual components are not connected to each other, but rather, are connected to one or more attachment surfaces or structures defined by sub-layers of the second layer 104, as will be described in connection with FIGS. 14A-14D.

FIGS. 14A-14D illustrate various embodiments of the second layer of the multi-layer cover sheet. In the embodiment illustrated in FIG. 14A, second layer 3041 includes a first sub-layer 3081, a second sub-layer 3101, and a third sub-layer 3121. In this embodiment, first sub-layer 3081 and third sub-layer 3121 can define a number of attachment structures or surfaces 3141 on which second sub-layer 3101 can attach. In various exemplary embodiments, second sub-layer 3101 can be, for example, any of the flexible materials illustrated in FIGS. 13A-13D, or second sub-layer 3101 can be formed of other materials that provide both a supporting function to the patient and facilitate a flow of air under the patient.

In various exemplary embodiments, the attachment surfaces 3141 can include inner surfaces and/or outer surfaces and/or openings of first and third sub-layers 3081 and 3121 on which the flexible material can directly attach, anchor, connect, etc, and through which air, vapor, and liquid can pass. In addition, first and third sub-layers 3081 and 3121 can be formed of a number of different materials each having a rigid, semi-rigid, or flexible property.

Figure 14A:
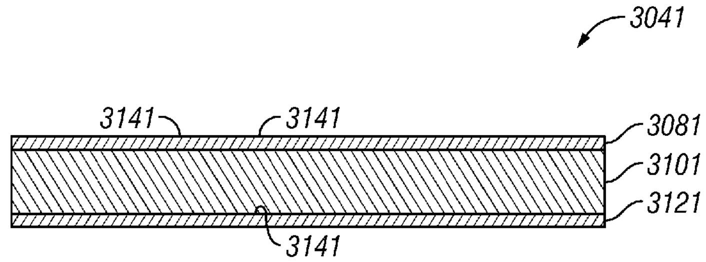
Figure 14B:
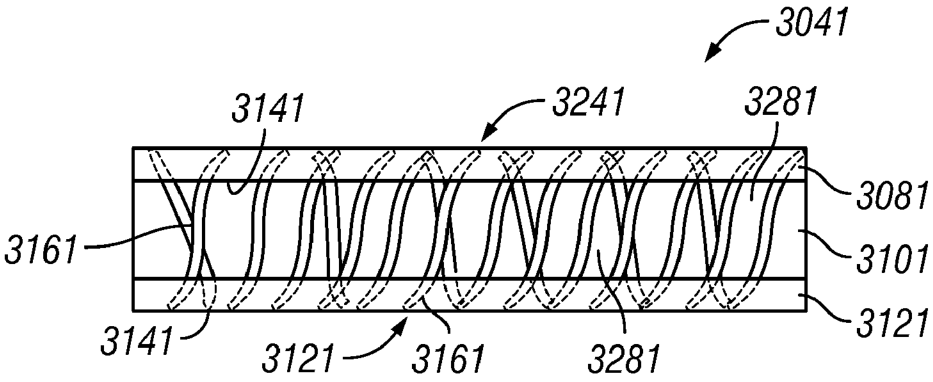

FIG. 14B illustrates a cross-sectional view of an exemplary embodiment of second layer 3041 of multi-layer cover sheet 1001 illustrated in FIG. 9. As shown in FIG. 14B, second sub-layer 3101 of second layer 3041 includes a flexible material formed of a number of individual strand members 3161 extending between first and third sub-layers 3081 and 3121 and attaching to first and third sub-layers 3081 and 3121 at various locations on first and third sub-layers 3081 and 3121. In this embodiment, first and third sub-layers 3081 and 3121 also include a flexible material, such that all three sub-layers of second layer 3041 can bend or flex under compressive forces. As shown in FIG. 14B, strand members 3161 define channels and openings 3281 within second sub-layer 3101 that facilitate the movement of air, vapor, and liquid through second layer 3041. In addition, openings (not shown in FIG. 14B) can be defined by surfaces of first and third sub-layers 3081 and 3121 and thus, can also facilitate the movement of air, and/or vapor, and/or liquid therethrough. An example of a material that can be used to form second layer 3041 of the multi-layer cover sheet includes a material under the trade name AirX™ which is manufactured by TYTEX GROUP.

Figure 14C:
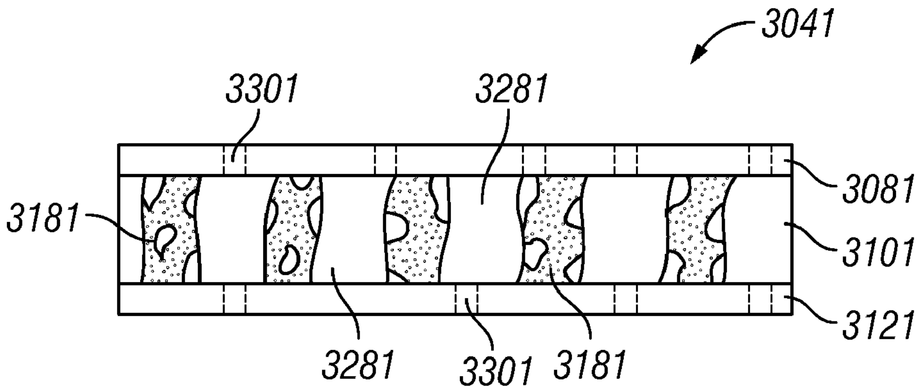

FIG. 14C illustrates a cross-sectional view of another exemplary embodiment of the second layer 3041 of the multi-layer cover sheet 1001 shown in FIGS. 8-12. As shown in FIG. 14B, the second layer 3041 includes the first, second, and third sub-layers 3081, 3101, and 3121. The flexible material forming second sub-layer 3101 of second layer 3041 includes a number of individual foam members 3181. Each foam member includes a porous or open cell structure that facilitates the movement of vapor, air, and liquid through foam members 3181. The foam members include a spaced apart configuration to define passages or openings 3281 that further facilitate the movement of air, vapor, and liquid therethrough. In addition, openings 3301 defined by the first and third sub-layers 3081 and 3121 also facilitate the movement of vapor, air, and liquid therethrough.

In various exemplary embodiments of FIGS. 14A-14C, the flexible material can be chemically attached to the first and third sub-layers 3081 and 3121 through the use of adhesives, and the like, and/or mechanically attached through the use of fasteners such as stitches, clasps, hook and loop, and the like, and/or physically attached through the use of welds, such as RF welds and related methods. As described herein, the shapes and sizes of the first, second, and third layers of exemplary embodiment of the multi-layer cover sheet, as well as sub-layers of the second layer can vary, and the exemplary embodiments illustrated in FIGS. 14A-14C are not limited to rectangular shapes, as shown. Other shapes and sizes are contemplated and can be designed based upon the intended application of the multi-layer cover sheet. For example, in various exemplary embodiments, the shape and size of the cover sheet can be designed based upon the support surface or platform for which it is to be used, such as a chair.

Figure 14D:
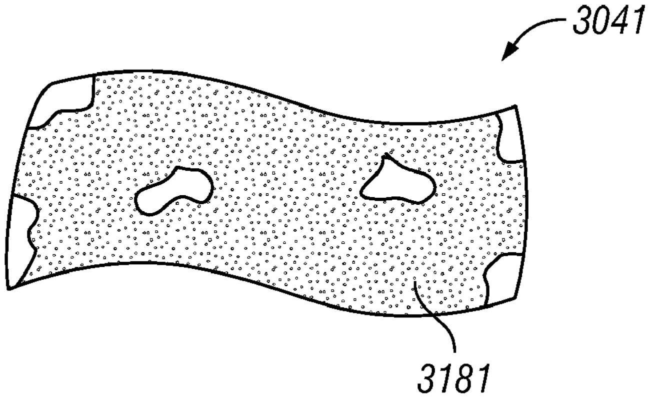

In the exemplary embodiment illustrated in FIG. 14D, the flexible material of second layer 3041 includes a single foam member 3181 having an open cell configuration. In this exemplary embodiment, single foam member 3181 is substantially the same perimeter size as the first and third layers 102 and 104 of multi-layer cover sheet 1001 illustrated in FIGS. 8 and 9. In the exemplary embodiment illustrated in FIG. 14D, foam member 3181 can be positioned between first and third layers 102 and 106 and secured by fastening first and third layers 102 and 106 to thereby enclose second layer 3041 within first and third layers 102 and 106 of multi-layer cover sheet 100. In various exemplary embodiments, foam member 3181 can include various sizes and shapes. For example, in some exemplary embodiments, single foam member 3181 has a perimeter that is smaller than the perimeter of the first and third layers 1021 and 1061.

Referring again to FIG. 9, in various exemplary embodiments, first and third layers 1021 and 1061 can be fastened together such that the entire perimeter of the multi-layer cover sheet is fastened. In other exemplary embodiments, a portion of the perimeter of first and third layers 1021 and 1061 can be fastened, while remaining portion(s) can be unfastened. In such exemplary embodiments, fastened portions, which are adjacent to unfastened portions of the perimeter, define a number openings 1107-1 to 1107-N (i.e., areas of the perimeter that are not fastened) through which air and vapor can move. The fastening of first and third layers 1021 and 1061 can include any number of techniques, including those described above in connection with fastening second layer 1041 to first and third layers 1021 and 1061. For example, in some exemplary embodiments, portions of first and third layers 1021 and 1061 are fastened together by stitching, while other portions are fastened together through the use of one or more buttons and/or hook and loop fasteners (i.e., VELCRO®) or the like. In other exemplary embodiments, first and third layers 1021 and 1061 are fastened together by welding them together along their perimeters using high frequency radio energy (i.e., RF welding) or ultrasonic energy (i.e., ultrasonic welding). Other forms of welding are also contemplated.

In various exemplary embodiments, third layer 1061 can be formed of a variety of different materials that exhibit various properties. In the exemplary embodiment illustrated in FIG. 9, third layer 1061 is formed of a vapor impermeable, air impermeable, and a liquid impermeable material. The impermeable property of third layer 1061 prevents vapor, air, and liquid from passing through third layer 1061 and therefore, prevents exposure of the air, vapor, and liquid to a support surface or platform, on which multi-layer cover sheet 1001 is positioned. In addition, third layer 1061 can function as a guide to direct the air, vapor, and liquid toward the openings defined by portions of the perimeter not fastened together, or to direct air from the openings and toward an elongate member, as will be described herein. In various embodiments, the third layer can also function as an attachment or coupling layer to attach the multi-layer cover sheet to a support surface or platform. For example, in various embodiments, the third layer can include extensions that can couple to the support surface such as a foam mattress. In such embodiments, the extensions can be wrapped around the support surface and tucked under the support surface or can be attached to the support surface using a variety of fasteners, such as those described herein. In other exemplary embodiments, the outer surface of the third layer can include a number of fasteners such as a hook and loop fasteners. In such exemplary embodiments, the support surface can be provided with a cover having a loop structure, and the third layer can include an outer layer having a hook structure. Other methods and mechanisms are contemplated for attaching the multi-layer cover sheet to a support surface or platform so as to secure the multi-layer cover sheet thereto.

In various exemplary embodiments, multi-layer cover sheet 1001 can be a one-time use cover sheet or a multi-use cover sheet. As used herein, a one-time use cover sheet is a cover sheet for single-patient use applications that is formed of a vapor, air, and liquid permeable material that is disposable and/or inexpensive and/or manufactured and/or assembled in a low-cost manner and is intended to be used for a single patient over a brief period of time, such as an hour(s), a day, or multiple days. As used herein, a multi-use cover sheet is a cover sheet for multi-patient use that is generally formed of a vapor permeable, liquid impermeable and air permeable or air impermeable material that is re-usable, washable, can be disinfected using a variety of techniques (e.g., autoclaved, bleach, etc.) and generally of a higher quality and superior in workmanship than the one-time use cover sheet and is intended to be used by one or more patients over a period of time such as multiple days, weeks, months, and/or years. In various exemplary embodiments, manufacturing and/or assembly of a multi-use cover sheet can involve methods that are more complex and more expensive than one-time use coversheets. Examples of materials used to form one-time use cover sheets can include, but are not limited to, non-woven papers. Examples of materials used to form re-usable cover sheets can include, but are not limited to, Gore-Tex®, and urethane laminated to fabric.

Figure 15B:
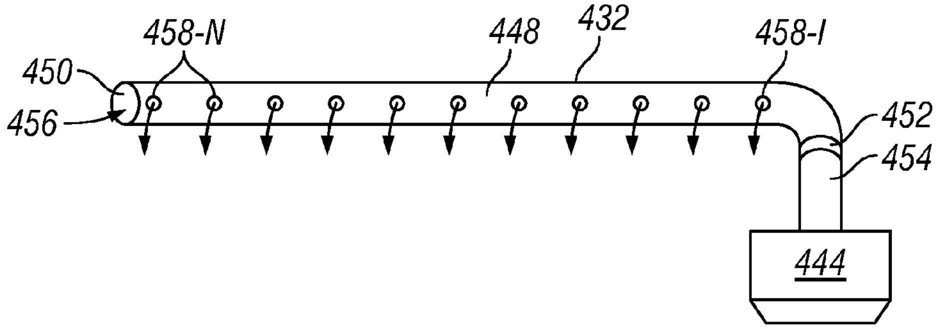
Figure 15C:
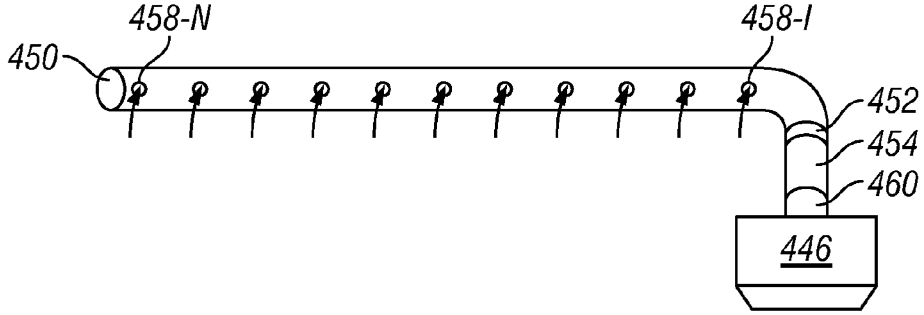

FIGS. 15A-15C illustrate various exemplary embodiments and components of the multi-layer cover sheet. FIG. 15A illustrates a perspective view of a multi-layer cover sheet 400 having an elongate member 432 in fluid communication with a source 434 to move air. FIG. 15B illustrates an exemplary embodiment of the elongate member 432 in fluid communication with a source 434 to move air under positive pressure, for example, a positive pressure air pump 444. FIG. 15C illustrates an exemplary embodiment of the elongate member in fluid communication with a source (e.g., a negative pressure air pump 446) to move air under negative pressure. Elongate member 432 functions to facilitate a movement of air inside elongate member 432, inside multi-layer cover sheet 400, and outside multi-layer cover sheet 400, when elongate member 432 is coupled to positive pressure air pump 444 or negative pressure air pump 446. For example, in embodiments that include positive pressure air pump 444, a positive pressure is supplied to elongate member 432 to move air through elongate member 432 and out of elongate member 432 for dispersion within multi-layer cover sheet 400, as will be described below in FIG. 15B. And, in exemplary embodiments that include negative pressure air pump 446, a negative or reduced pressure is supplied to elongate member 432 to move air into and through multi-layer cover sheet 400 and into elongate member 432. In either case, movement of air is being provided to the multi-layer cover sheet that can create and maintain a partial pressure difference of vapor and thus, aid in moisture and heat removal from the patient and from the environment surrounding the patient.

In various exemplary embodiments, the use of negative pressure air pump 446 can help reduce billowing of multi-layer cover sheet 400. Billowing can occur when a mattress or cover sheet elevates or inflates in the location adjacent and proximal to the periphery of a patient's body under the weight of the patient. Negative pressure produced from negative pressure air pump 446 can reduce the tendency of the multi-layer cover sheet to billow because the negative pressure tends to cause first layer 102 to lay flat against second layer 104 and thus, can aid or facilitate a flow of air directly under the patient as opposed to around the patient, as can occur when a mattress or cover sheet billows.

As shown in the exemplary embodiment illustrated in FIG. 15A, multi-layer coversheet 400 includes elongate member 432. As described herein, elongate member 432 can extend from a side of multi-layer cover sheet 400 and toward the same side or a different side. In the exemplary embodiment illustrated in FIG. 15A, for example, elongate member 432 extends from a first side 436 toward a second side 438 of multi-layer cover sheet 400. In some exemplary embodiments, elongate member 432 can extend from a third side 440 toward a fourth side 442 of multi-layer cover sheet 400, or any combination of sides. As described herein, the multi-layer cover sheet can include various cross-sectional shapes, and thus, the number of sides can vary. As such, in various exemplary embodiments, the elongate member can extend from a side toward a different side or multiple sides in exemplary embodiments having two or more sides.

In various exemplary embodiments, elongate member 432 can be positioned at differing locations of multi-layer cover sheet 400. For example, in some exemplary embodiments, the elongate member can be positioned proximal or adjacent an inner surface (e.g., inner surfaces of the first and third layers 404 and 408) of the multi-layer cover sheet 400 such that it extends from the first side 436 toward the second side 438 of the multi-layer cover sheet adjacent a length of the third side 440 of multi-layer cover sheet 400. In the exemplary embodiment illustrated in FIG. 15A, the elongate member 432 is positioned such that it extends from the first side 436 toward the second side 438 in a linear manner adjacent the third side 440. In other exemplary embodiments, the elongate member 432 can be positioned such that it extends from the first side 436 toward the second side 438 in a non-linear manner, and along a single plane or along various planes inside the multi-layer cover sheet. For example, the elongate member can be positioned in a non-linear manner and along various planes within the multi-layer cover sheet such that as it extends from the first side 436 toward the second side 438 of the multi-layer cover sheet, it bends and turns in a number of directions. In one exemplary embodiment, elongate member 432 extends along areas proximal and/or adjacent to surfaces of the first layer 404 and/or second layer 406 in which moisture and or heat from a patient are present in higher concentrations relative to other portions of the patient. Non-limiting examples of such areas include the seat region 103 illustrated in FIGS. 11 and 12. As the reader will appreciate, positioning the elongate member proximal and/or adjacent to such surfaces (e.g., seat region 103) can help to increase the rate and efficiency of vapor and heat transfer from the patient because the movement of air within the elongate member will be proximal or adjacent to such surfaces, and thus a potentially higher partial pressure difference of vapor can be created between the internal environment of the multi-layer cover sheet and the external environment outside the multi-layer cover sheet.

In various exemplary embodiments, the elongate member 432 can have a variety of cross-sectional shapes and sizes and can be configured in a variety of ways. For example, in exemplary embodiments, the elongate member 432 can include, but is not limited to, circular, ovular, polygonal, and irregular cross-sectional shapes. In some exemplary embodiments, the elongate member can be linear or straight as it extends from the first side 436 toward the second side 438, as shown in FIG. 15A. In other exemplary embodiments, the elongate member 432 can include a series of bends or turns as it extends from the first side 436 toward the second side 438, as described herein. In various exemplary embodiments, the elongate member 432 can include a size that equals a length of the multi-layer cover sheet 400 and in other exemplary embodiments, the elongate member 432 can include a size having a length less than or greater than the length of the multi-layer cover sheet 400.

As shown in FIG. 15A, the elongate member 432 is positioned inside the multi-layer cover sheet 400. In some embodiments, the elongate member can be positioned adjacent the multi-layer cover sheet outside the multi-layer cover sheet. And, in other embodiments, the elongate member can be positioned at least partially within the multi-layer cover sheet, such that a portion of the elongate member extends to the outside of the multi-layer cover sheet.

The elongate member 432 can be formed of a single material or a variety of materials and can have a number of different configurations. Materials to form the elongate member 432 can include, but are not limited to, polymers, metals, metal alloys, and materials that include natural and/or synthetic particles, fibers, filaments, etc., and combinations thereof. Other materials can include flexible metals and metal alloys, shape memory metals and metal alloys, and shape memory plastics. Configurations can include one or more outer layers 448 and/or one more cores 450. The outer layer(s) 448 of the elongate member 432 define a lumen 456. In some exemplary embodiments, the lumen 456 can include a core 450 positioned within the lumen 456. In various embodiments of the elongate member, the outer layer and/or the core can be designed to facilitate the movement of air through the elongate body. As such, in various exemplary embodiments, the outer layer and/or the core can include configurations that define openings through which air and/or vapor, and/or liquid can pass.

In the exemplary embodiments illustrated in FIGS. 15B and 15C, the elongate member 432 has an outer layer 448 formed of a knitted or woven cover and a core 450 formed of a flexible material, such as the strand member 216, the foam member 218, the coil member 220, and the convoluted member 222 illustrated in FIGS. 13A-13D. In such exemplary embodiments, the core 450 can also include a multiple-layer configuration such as the three sub-layer configuration of the second layer 3041 illustrated in FIG. 14A, where the second sub-layer is formed of a strand member, such as strand member 216 illustrated in FIG. 13A. Other configurations are also contemplated. For example, in some exemplary embodiments, the core 450 can be formed of suitable spacer material and enveloped by the outer layer 432.

As shown in FIGS. 15B and 15C, the elongate member 432 is in fluid communication with a source 444 or 446 to move air under either positive or negative pressure. In the exemplary embodiment illustrated in FIG. 15B, the source to move air under positive pressure is a positive pressure air pump 444. And, in the exemplary embodiment illustrated in FIG. 15C, the source to move air under negative pressure is a negative pressure air pump 446. Both the inflationary air pump 444 and vacuum air pump 446 are connected to a conduit 452, which in turn, is connected to the elongate member 432. In various exemplary embodiments, connecting the air pumps 444 and 446, the conduit 452, and the elongate member 432 can be accomplished through the use of one or more connector components. For example, in some embodiments, the multi-layer cover sheet can include a connector component 454 coupled to a surface of the multi-layer cover sheet, the connector component 454 defines an opening between the internal environment of the multi-layer cover sheet 400 and the external environment 464 surrounding the multi-layer cover sheet 400. In such exemplary embodiments, the elongate member 432 can be coupled to the conduit 452 from inside the multi-layer cover sheet and the connector component 454 can be coupled to the conduit 452 from outside the multi-layer cover sheet.

In various exemplary embodiments, surfaces of the elongate member 432 can define a number of ports 458-1 to 458-N that allow air to enter or exit the elongate member 432. For example, in the exemplary embodiment illustrated in FIG. 15B, the inflationary air pump 444 forces air (indicated by arrows) through the elongate member 432, through ports 458-1 to 458-N, and into the multi-layer cover sheet. And, in the exemplary embodiment illustrated in FIG. 15C, the vacuum air pump 446 forces air from the multi-layer cover sheet and into the negative pressure air pump 446, where it is dispersed back into the environment.

As described herein, exemplary embodiments of the present disclosure can include a number of antimicrobial devices, agents, etc. Examples of antimicrobial devices can include mechanical devices such as filters, energy devices such as ultraviolet light sources, and chemical agents such as antimicrobial coatings. Other antimicrobial devices and agents are also contemplated.

For example, in the exemplary embodiment illustrated in FIG. 15C, an antimicrobial device 460 such as a filter can be utilized with multi-layer cover sheet. In one exemplary embodiment, the filter is positioned such that air passes through the filter prior to entering the negative pressure air pump. In this exemplary embodiment, the possibility of pump contamination is reduced. In various exemplary embodiments, the antimicrobial device 460 can be positioned at one or more of the following locations: inside the negative pressure air pump 446, adjacent the negative pressure air pump 446, proximal the negative pressure air pump 446, and distal to the negative pressure air pump. In various exemplary embodiments, the filter can be designed to receive and contain particulate and fibrous matter from the environment surrounding the patient and inside the multi-layer cover sheet. In various exemplary embodiments, and as described herein, this matter can include potentially harmful pathogens.

FIGS. 16A and 16B illustrate various exemplary embodiments of a system 570 of the present disclosure. In various exemplary embodiments of FIGS. 16A and 16B, the system 570 can include a multi-layer cover sheet 532 positioned on a support surface 572. In various exemplary embodiments, the multi-layer cover sheet can include the multi-layer cover sheet illustrated in FIGS. 8, 9, and 15A. In various exemplary embodiments, the support surface 572 can include a number of surfaces and support platforms. For example, support surfaces 572 can include, but are not limited to, an inflatable mattress, a foam mattress, a gel mattress, and a water mattress. Other support surfaces and platforms include the AtmosAir® mattress, the TheraRest® mattress, RIK® Fluid Mattress, the BariKare® Mattress, which are commercially available and owned by Kinetic Concepts, Inc., of San Antonio, Tex. Each of the family of beds, mattresses, and other support surfaces provide various features, therapies, and benefits to the patient, and each are incorporated herein by reference.

In the exemplary embodiment illustrated in FIGS. 16A and 16B, the multi-layer cover sheet 532, the multi-layer cover sheet includes a first layer 502 formed of a vapor permeable material, a second layer 504 formed of a flexible material, the flexible material to facilitate at least a flow of vapor entering the second layer 504 through the first layer 502, and a third layer 506.

In various exemplary embodiments, the system can also include a source to move air inside and outside the multi-layer cover sheet. In some embodiments, the source to move air can include a positive pressure air source, such as the positive pressure air source 444 illustrated in FIG. 15B. And, in other exemplary embodiments, the source to move air can include a negative pressure air source, such as the negative pressure air source 446 illustrated in FIG. 15C.

As shown in the exemplary embodiment of FIG. 16A, the system includes a positive pressure air source 544 in fluid communication with an elongate member (not shown), such as the elongate member illustrated in FIGS. 15A-15C. The positive pressure air source 544 forces air (indicated by arrow 580) through the elongate member and out of openings defined by surfaces of the elongate member where it is dispersed inside the multi-layer cover sheet 532, as described herein. The movement of air within the multi-layer cover sheet creates a dry environment inside the multi-layer cover sheet 532. Heat and moisture on and around the patient can be removed from the patient due to the partial pressure difference in vapor between the internal areas of the multi-layer and the environment 582 surrounding the patient. The moisture on and around the patient has a tendency to move from the area of high concentration on and around the patient to the area of lower moisture concentration within the multi-layer cover sheet. The movement of air within the multi-layer cover sheet, induced by the source of positive pressure 544, also moves the vapor which has passed through the first layer of the multi-layer cover sheet 532 and into the second layer, where it is dispersed into the environment via openings in the multi-layer cover sheet, as described herein. As described herein, a partial pressure difference can result in a flow of air to maintain a partial pressure difference of vapor such that vapor flows from outside the multi-layer cover sheet 532 to the inside of the multi-layer cover sheet 532 via the vapor permeable first layer.

As shown in the exemplary embodiment of FIG. 16B, the system 570 includes a negative pressure air source 546 in fluid communication with an elongate member (not shown), such as the elongate member illustrated in FIGS. 15A-15C. The negative pressure air source creates a vacuum in the internal areas of the multi-layer cover sheet, which moves air 580 from outside the multi-layer cover sheet and into the multi-layer cover sheet where it passes under the patient and into the elongate member of the multi-layer cover sheet. The elongate member transfers air 580 and vapor and/or heat toward an antimicrobial device and/or agent 560 and then into the source of negative pressure 546. The treated air is then dispersed back into the environment by the source of negative pressure 546. As described herein, the partial pressure difference can result in a flow of air to maintain a partial pressure difference of vapor such that vapor flows from outside the multi-layer cover sheet 532 to the inside of the multi-layer cover sheet 532 via the vapor permeable first layer.

Referring now to FIGS. 17-20, an exemplary embodiment of a cover sheet 500 comprises a first end 502, a second end 504, a first side 506, a second side 508. The exemplary embodiment shown comprises a vapor-permeable top layer 510, an middle layer 520 comprising a spacer material, and a bottom layer 530. In this embodiment, cover sheet 500 also comprises an aperture 535 in bottom layer 530 and proximal to first end 502, as well as an air mover 540 in fluid communication with aperture 535. In the exemplary embodiment shown, aperture 535 and air mover 540 are located in a tab or extension 509 that allows air mover 540 to be placed near the end of a supporting mattress 560 (as shown in FIGS. 19 and 20). In other embodiments cover sheet 500 may not comprise an extension for air mover 540.

The principles of operation for the exemplary embodiment disclosed in FIGS. 17-20 are similar to those of embodiments described above. In general, moisture vapor is transferred from a patient (not shown), through top layer 510, to air contained in middle layer 520. Air mover 540 pushes or pulls air through middle layer 520 so that moisture vapor can be removed from the air contained in middle layer 520. In certain exemplary embodiments, air mover 540 is a centrifugal 12 volt (nominal) DC fan manufactured by Panasonic under the part number FAL5F12LL. This particular air mover is approximately 3 inches wide by 3 inches tall by 1.1 inches thick and weighs approximately 3.5 ounces. This air mover also produces a maximum air flow of approximately 8.8 cfm and maximum air pressure of approximately 6.2 mmH2O at a nominal 12 volts. During operation, the air flow will be reduced as the pressure across the air mover is increased. Exemplary embodiments using this air mover typically have an air flow of approximately 1.0 to 2.0 cfm during operation. A graph of air pressure, air flow, and nominal speed for various voltages is provided in FIG. 23. As shown in FIG. 23, this air mover provides less than 6 mmH2O differential pressure at flow rates of approximately 2.0 cfm. The Panasonic FAL5F12LL air mover also creates low noise levels (30.0 dB-A, according to the manufacturer's specifications).

In this exemplary embodiment, top layer 510 is bonded to bottom layer 530 at first end 502 and at first and second sides 506 and 508. In the exemplary embodiment shown, top layer 510 and bottom layer 530 form a shell or envelope that substantially encases middle layer 520, but top layer 510 and bottom layer 530 are not sealed around their entire perimeter. Such a configuration allows air to enter cover sheet 500 from the outside environment and flow through middle layer 520. As shown in FIG. 18, second end 504 is open, so that top layer 510 and bottom layer 530 are not connected at second end 504, and middle layer 520 is exposed to the outside environment.

In the exemplary embodiment shown in FIG. 18, second end 504 may be constructed so that middle layer 520 is exposed to the outside environment along the entire second end 504. In other embodiments, second end 504 may be partially sealed (i.e. top layer 510 and bottom layer 530 may be connected along a portion of second end 504) so that a portion of middle layer 520 proximal to second end 504 is exposed to the outside environment. In certain exemplary embodiments, second end 504 may be partially sealed so that a second aperture similar to aperture 535 is provided at second end 504. In such embodiments, air mover 540 may be placed at either first end 502 or second end 504 of cover sheet 500. Such a configuration can provide flexibility in the configuration of cover sheet 500 by allowing air mover 540 to be placed at either first end 502 or second end 504, thereby allowing air mover 540 to be placed at either the head end or the foot end of the patient. In other embodiments, air mover 540 may be placed in a different location, and second layer 520 may be exposed to the outside environment in locations other than first end 502 or second end 504.

In still other exemplary embodiments, first layer 510 and second layer 530 may be comprised of the same material and configured to form a shell that contains middle layer 520. In other exemplary embodiments, first layer 510 may comprise a section of material with high vapor permeability in the center section (closest to a person's trunk) and materials with lower vapor permeability (and perhaps lower cost) in the side areas not directly underneath a person's trunk. In certain exemplary embodiments, first layer 510 may also be air permeable to allow air to flow through first layer 510 in addition to an opening between first layer 510 and third layer 530.

In exemplary embodiments, the portion of top layer 510 and bottom layer 530 that is not bonded is distal from air mover 540. During operation, this can allow air mover 540 to push or pull air through a larger portion of middle layer 520 and remove more moisture vapor from middle layer 520. In exemplary embodiments, cover sheet 500 may comprise a liquid impermeable layer. For example top layer 510 may be a vapor permeable, liquid impermeable material such as GoreTex® or bottom layer 530 may be a liquid impermeable material such as urethane. Other exemplary embodiments may comprise different materials or combinations of materials. The embodiment disclosed in FIGS. 17-20 may also comprise additional features (such as antimicrobial devices, not shown) similar to those described with respect to other embodiments in this disclosure.

Referring now to FIGS. 21 and 22, another exemplary embodiment of a cover sheet 600 comprises a zipper 650 and a second tab or extension 619 with a second aperture 645 in addition to first extension 609 and first aperture 635. The remaining aspects of the embodiment shown in FIG. 21 are equivalent to those described in cover sheet 500 of FIGS. 17-20. For example, cover sheet 600 comprises a first end 602, a second end 604, a first side 606, a second side 608, and first, second and third layers 610, 620, and 630.

In the exemplary embodiment of FIG. 21, zipper 650 extends generally around the perimeter of cover sheet 600, but does not extend around extensions 609 or 619. In exemplary embodiments, zipper 650 is coupled to third layer 630 through any suitable means, such as stitching or RF welding. In exemplary embodiments, zipper 650 is configured so that it may be zipped to a corresponding zipper on a mattress or other support system. In a specific exemplary embodiment, zipper 650 can be configured to zip to a zipper on an Atmos Air® mattress provided by Kinetic Concepts, Inc. As shown in the side view of FIG. 22, cover sheet 600 may be coupled to a mattress 660 via zipper 650. As shown, extensions 609 and 619 extend beyond zipper 650 and hang at the end of mattress 660.

In certain exemplary embodiments, first layer 610 and third layer 630 may be coupled (for example, by stitching or welding) at seam 615. As shown in FIG. 21, seam 615 extends around the entire perimeter of cover sheet 600, including extensions 609 and 619. Second layer 620, as well as apertures 635 and 645 are inside the area surrounded by seam 615. An air mover (not shown) can be coupled to either aperture 635 or aperture 645 to provide negative or positive air pressure to the chamber created by first layer 610, third layer 630, and seam 615. If a negative air pressure air mover is used, outside air can then be drawn from either aperture 635 or 645 (opposite of the air mover), drawn through second layer 620, and exhausted through the air mover. If a positive air pressure air mover is used, air can be pushed from the aperture that the air mover is coupled to, through second layer 620 and out of the aperture opposite from air mover. The embodiment disclosed in FIGS. 21-22 may also comprise additional features (such as antimicrobial devices, not shown) similar to those described with respect to other embodiments in this disclosure.

The invention claimed is:

1. A patient support system comprising:

a spacer material;

a shell, wherein:

the spacer material is at least partially encased in the shell; and a first portion of the shell is vapor permeable; and an air mover, wherein the air mover is configured to pull air through the spacer material and toward the air mover.

2. The patient support system of claim 1, wherein the air mover is integral with the shell.

3. The patient support system of claim 1, wherein the air mover is in fluid communication with the spacer material via a conduit.

4. The patient support system of claim 1 wherein the shell comprises an aperture.

5. The patient support system of claim 1, wherein a second portion of the shell is liquid impermeable.

6. The patient support system of claim 1 wherein the spacer material is selected from the group consisting of: open cell foam; natural or synthetic polymer particles, filaments, or strands; cotton fibers; polyester fibers; flexible metals and metal alloys; shape memory metals and metal alloys, and shape memory plastics.

7. The system of claim 1 further comprising a filter proximal to the air mover.

8. The support system of claim 1 wherein the spacer material is configured to permit air to flow through the spacer material while the spacer material supports a person laying on the support system.

9. A patient support system comprising:
- a first layer comprising a vapor permeable material;
- a second layer comprising a flexible material configured to allow lateral movement of air under a compressive load of a patient;
- a third layer, wherein the second layer is between the first layer and the third layer; and
- an air mover, wherein the air mover is configured to reduce pressure within the flexible material, wherein the first layer comprises an aperture configured to allow suction air flow through the aperture and into the second layer.

10. The patient support system of claim 9 wherein the air mover is integral with either the first layer or the third layer.

11. The patient support system of claim 9 wherein the air mover is in fluid communication with the flexible material via a conduit.

12. A patient support system comprising:
- a first layer comprising a vapor permeable material;
- a second layer comprising a flexible material configured to allow lateral movement of air under a compressive load of a patient;
- a third layer, wherein the second layer is between the first layer and the third layer;
- an air mover, wherein:
  - the air mover is configured to reduce pressure within the flexible material;
  - the first layer comprises a center section and two side sections; and
  - the center section has a higher vapor permeability rate than the two side sections.

13. The patient support system of claim 9 wherein the flexible material is selected from the group consisting of: open cell foam; natural or synthetic polymer particles, filaments, or strands; cotton fibers; polyester fibers; flexible metals and metal alloys; shape memory metals and metal alloys, and shape memory plastics.

14. The system of claim 9 further comprising an antimicrobial device proximal to the air mover.

15. A system comprising:
- a cover sheet, wherein the cover sheet comprises a first layer that is moisture vapor permeable;
- a support mattress; and
- a first air mover comprising a first air inlet and a first air outlet, wherein the first air inlet is coupled to the cover sheet and the first air outlet is exhausted to atmosphere.

16. The system of claim 15 further comprising an antimicrobial device proximal to the first air mover.

17. The system of claim 15 wherein the cover sheet is a one-time use cover sheet for single patient use applications.

18. The system of claim 15 further comprising a second air mover comprising a second air inlet and a second air outlet, wherein the second air inlet is configured to draw air from the atmosphere and the second outlet is coupled to the cover sheet.

19. The system of claim 15 wherein the first air mover is configured to operate at multiple voltages and provide multiple air flow rates.

20. A system comprising:
- a cover sheet, wherein the cover sheet comprises a first layer that is moisture vapor permeable;
- a support mattress; and
- an air mover comprising an air inlet and an air outlet, wherein the air inlet is coupled to the cover sheet and the air outlet is coupled to a chamber within the mattress.

21. The system of claim 20 wherein the support mattress is an alternating-pressure-pad-type mattress.

22. The system of claim 15 wherein the cover sheet is a one-time use cover sheet for single patient use applications.

* * * * *